(12) United States Patent
Schmelz et al.

(10) Patent No.: US 9,052,473 B2
(45) Date of Patent: Jun. 9, 2015

(54) PIVOTING LATCH FOR CABLE HOUSING

(71) Applicant: Samtec, Inc., New Albany, IN (US)

(72) Inventors: Dale Francis Schmelz, Depauw, IN (US); Chadrick Paul Faith, Corydon, IN (US); William Chieng Ouyang, New Albany, IN (US)

(73) Assignee: Samtec, Inc., New Albany, IN (US)

( * ) Notice: Subject to any disclaimer, the term of this patent is extended or adjusted under 35 U.S.C. 154(b) by 250 days.

(21) Appl. No.: 13/667,107

(22) Filed: Nov. 2, 2012

(65) Prior Publication Data
US 2014/0127930 A1 May 8, 2014

(51) Int. Cl.
| H01R 13/62 | (2006.01) |
| G02B 6/38 | (2006.01) |
| H01R 13/629 | (2006.01) |
| G02B 6/42 | (2006.01) |

(52) U.S. Cl.
CPC ........ *G02B 6/3897* (2013.01); *H01R 13/62933* (2013.01); *G02B 6/4278* (2013.01)

(58) Field of Classification Search
CPC .. G02B 6/3897; G02B 6/4278; H01R 13/629; H01R 13/62933
USPC .................................. 439/350, 353–358, 372
See application file for complete search history.

(56) References Cited

U.S. PATENT DOCUMENTS

| 6,890,205 | B1 | 5/2005 | Wu | |
| 7,083,460 | B2* | 8/2006 | Wu | 439/357 |
| 7,226,307 | B1 | 6/2007 | Chen et al. | |
| 7,281,937 | B2 | 10/2007 | Reed et al. | |
| 7,445,484 | B2* | 11/2008 | Wu | 439/352 |
| 7,654,849 | B2* | 2/2010 | Gordon et al. | 439/350 |
| 7,736,171 | B2 | 6/2010 | Reed et al. | |
| 7,780,466 | B1* | 8/2010 | Wu | 439/354 |
| 8,267,718 | B2* | 9/2012 | Straka et al. | 439/497 |
| 8,905,442 | B2* | 12/2014 | Ishigami et al. | 292/128 |
| 2006/0014408 | A1 | 1/2006 | Guan et al. | |
| 2010/0105234 | A1 | 4/2010 | Wollitzer et al. | |
| 2011/0111618 | A1* | 5/2011 | Su et al. | 439/357 |
| 2013/0323970 | A1* | 12/2013 | Wang et al. | 439/607.08 |

FOREIGN PATENT DOCUMENTS

KR    20-2009-0006393 U    6/2009

OTHER PUBLICATIONS

Official Communication issued in corresponding International Patent Application PCT/US2013/055290, mailed on Dec. 10, 2013.

* cited by examiner

*Primary Examiner* — Khiem Nguyen
(74) *Attorney, Agent, or Firm* — Keating & Bennett, LLP

(57) ABSTRACT

A plug housing preferably includes an upper housing and a lower housing defining a cavity and a latch portion arranged to be pivotable about the plug housing and including a pair of actuator beams. Respective ones of the pair of actuator beams are preferably arranged to be directly opposed to respective side surfaces of the plug housing. The latch portion is preferably arranged to be connected to the upper housing and the lower housing through a pair of projection portions or a pair of pivot holes arranged on opposite ones of the pair of actuator beams of the latch portion. The latch portion is preferably pivotable about the plug housing at a position corresponding to the pair of projection portions or the pair of pivot holes. The latch preferably includes a catch mechanism and a spring mechanism connected to a forward plate without contacting the pair of actuator beams.

24 Claims, 21 Drawing Sheets

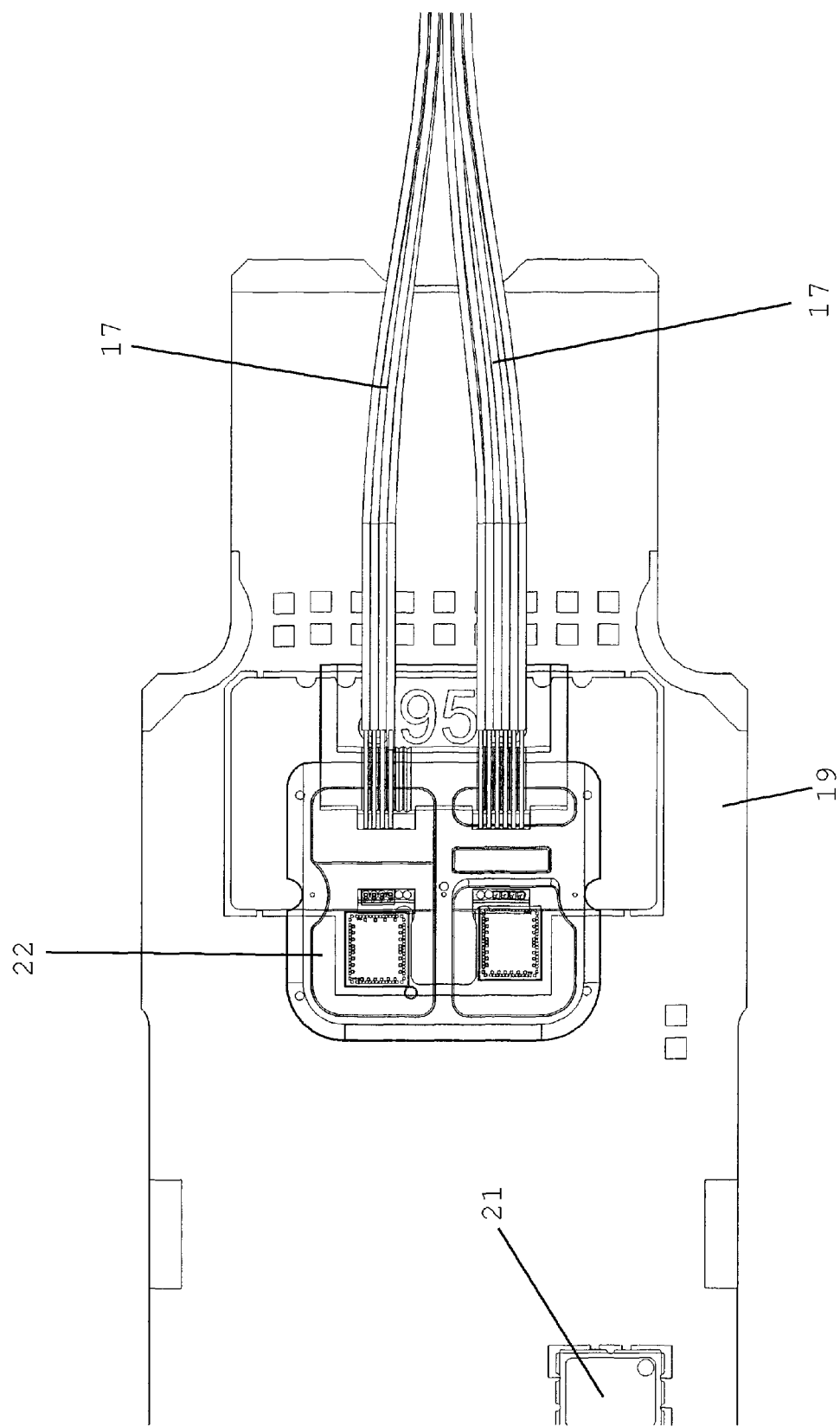

PIVOTING LATCH FOR CABLE HOUSING

BACKGROUND OF THE INVENTION

1. Field of the Invention

The present invention relates to a cable housing. More specifically, the present invention relates to a cable housing including a pivoting latch arrangement.

2. Description of the Related Art

Cable housings arranged to connect optical or electrical cables to receiving receptacles are well known in the art. In such arrangements, it is necessary to releasably connect the cable housings to the receiving receptacles in a manner that is both firm and secure. Conventional arrangements that have been tried in the art include cable housings which include latches arranged to slide in and out of receiving notches on the receiving receptacle. Such latches typically include actuators with a pull tab that moves the latch such that the latch will slide in and out of the notches on the receiving receptacle and screws, rivets, and/or other fasteners arranged to fix the latches to the cable housing in a manner that permits the latch to move in relation to the cable housing. Such latches can be made of thin flexible metal members, insert molded members including flexible metal members embedded within a resin or plastic material, or any other desirable strong but flexible material.

For example, U.S. Pat. Nos. 7,281,937 and 7,736,171 show examples of conventional cable housings. In such conventional cable housings, latches include a locking portion defined by a stiff member that is arranged to be inserted into notches in a receiving receptacle, a spring that flexes and springs back, and an actuator portion with a pull tab that is flexible to accommodate a user's hands/fingers, but which is non-elastic in a length direction so that a pulled tension applied to the pull tab will transfer a force to actuate the spring to move the locking portion out of the notches in the receiving receptacle.

Also known are cable housings which include single-piece flexible-flat-plate-metal latches which are mounted to an upper surface of the cable housings which screws, rivets, etc. Such conventional single-piece flexible-flat-plate-metal latches are typically provided with a locking portion arranged to be inserted into notches provided in a receiving receptacle, a fixed portion arranged at the upper surface of the cable housings about which the single-piece flexible-flat-plate-metal latch pivots, and an actuation point which is arranged to be actuated by a user's hands/fingers to cause the single-piece flexible-flat-plate-metal latch to pivot about the fixed portion to move the locking portion out of the notches provided in the receiving receptacle. When there is no force being applied to the actuation point, the locking portion will be retained within the notches provided in the receiving receptacle because of a biased spring force of the single-piece flexible-flat-plate-metal latch at the fixed portion.

However, the above described conventional cable housings suffer from various deficiencies. The multi-component conventional cable housings such as those including a pull tab are difficult to install and are expensive because of the large number of parts used therein. The single-piece flexible-flat-plate-metal latches are hard to press and can sometimes unlatch easily. Not only that, but the screws, rivets, etc. used to mount the single-piece flexible-flat-plate-metal latches to the conventional cable housings penetrate into the conventional cable housings, reducing the total amount of room available for other components to be provided within the conventional cable housings.

SUMMARY OF THE INVENTION

To overcome the problems described above, preferred embodiments of the present invention provide a plug housing with a superior latch, in which a pivot point of the latch is shifted forward, while the actuation point is shifted toward the back of the plug housing. Shifting the pivot point forward provides a latch with a smaller range of motion and greater precision. In addition, shifting the actuation point back gives a greater mechanical moment to the arms of the latch, a lower required actuation force, and a more convenient location to grasp and actuate the latch. Moving the structure of the locking portion, spring, and actuation members of the latch towards outer side walls of the plug housing more evenly distributes forces and provides a stronger beam design for a mechanical moment arm of the latch.

A preferred embodiment of the present invention provides a plug housing including an upper housing and a lower housing defining a cavity and a latch portion arranged to be pivotable about the plug housing and including a pair of actuator beams such that respective ones of the pair of actuator beams are arranged to be directly opposed to respective side surfaces of the plug housing. The plug housing is arranged to be connected to the upper housing and the lower housing. The plug housing preferably includes a pair of projection portions arranged on opposite side surfaces of at least one of the upper housing and the lower housing or on opposite ones of a pair of actuator beams of the latch portion, and pivot holes arranged to receive a respective one of the pair of projection portions inserted therein, the pivot holes being defined in the opposite side surfaces of at least one of the upper housing and the lower housing or in opposite ones of the pair of actuator beams of the latch portion. Thus, the latch portion is pivotable about the plug housing at a position corresponding to the pair of projection portions. Additionally, respective ones of the pair of actuator beams are preferably arranged to be directly opposed to respective ones of the opposite side surfaces.

The plug housing preferably includes a catch mechanism and an actuating mechanism arranged at opposing ends of the pair of actuator beams of the latch portion. The catch mechanism is preferably arranged to engage with a connecting portion of a receiving receptacle that is arranged to receive the plug housing to prevent the plug housing from being removed from the receiving receptacle. Additionally, the catch mechanism and the connecting portion are preferably arranged such that they can be selectively engaged and disengaged by applying or removing a force to the actuating mechanism such that the latch portion will pivot about the pair of projection portions. The catch mechanism preferably includes at least one tooth that is arranged to engage with a corresponding at least one notch arranged to receive the at least one tooth in the connection portion such that the catch mechanism will preferably prevent the plug housing from being removed from the receiving receptacle.

Additionally, the latch portion preferably includes a spring mechanism arranged to press against one of the upper housing and the lower housing to apply a biasing force to the latch portion about the pair of projection portions. The spring mechanism is preferably arranged on a forward plate of the latch portion which is arranged between the pair of actuator beams, where the catch mechanism preferably is connected to a side of the forward plate that is opposite to a side of the forward plate that is connected to the spring portion.

The plug housing preferably includes a circuit board arranged within the cavity, the circuit board, and a cable preferably extending into the cavity. The cable is preferably an optical cable including strengthening strands and optical fibers. The optical fibers of the optical cable are preferably connected to the optical engine, and the plug housing preferably further includes a fastener that fixes the strengthening strands within the plug housing. In preferred embodiments of the present invention, the circuit board preferably includes at least one active electrical component, such as, for example, a memory chip, a microprocessor, a microcontroller, an EEPROM chip, a hot swap controller chip arranged to mitigate inverse currents when plugging into live electronics, a clock chip arranged to generate a clock signal, and/or a radio frequency detector chip.

The latch portion is preferably defined by a single monolithic element including the catch mechanism, the actuating mechanism, the spring mechanism, the forward plate, and the pair of actuator beams. The catch mechanism and the spring mechanism are preferably connected to the forward plate without contacting the pair of actuator beams, and the actuating mechanism and the forward plate are preferably arranged between the pair of actuator beams. The pair of actuator beams are preferably arranged to extend downward in a perpendicular or substantially perpendicular direction from at least one of the forward plate and the actuating mechanism.

Further, fasteners are preferably inserted into through holes in the upper housing and the lower housing such that the fasteners fix the upper housing and the lower housing together. The pair of projection portions are preferably provided together with the at least one of the upper housing and the lower housing as a single monolithic member. One or both of the upper housing and the lower housing preferably provide a strain relief connector arranged to support a strain relief of the cable. Also, one or both of the upper housing and the lower housing preferably include circuit board supports arranged in the cavity to support the circuit board.

One of the upper housing and the lower housing preferably includes channels arranged along one or more sides and another of the upper housing and the lower housing preferably includes corresponding ridges arranged along one or more sides, the ridges are preferably arranged to be inserted within the channels. One of the upper housing and the lower housing preferably includes holding projections and another of the upper housing and the lower housing preferably includes retaining clips, where the holding projections are preferably arranged to be inserted into the retaining clips. Heat fins are preferably provided on one or both of the upper housing, and the lower housing and the forward plate of the latch portion is preferably arranged to extend directly over the heat fins provided on the one or both of the upper housing and the lower housing.

The above and other features, elements, characteristics and advantages of the present invention will become more apparent from the following detailed description of preferred embodiments of the present invention with reference to the attached drawings.

BRIEF DESCRIPTION OF THE DRAWINGS

FIG. 7 is a plan view showing a portion of a printed circuit board that is arranged within the plug housing in accordance with a preferred embodiment of the present invention.

DETAILED DESCRIPTION OF PREFERRED EMBODIMENTS

Preferred embodiments of the present invention will be described in detail with reference to the accompanying drawings. The following description is in all aspects illustrative and not restrictive, and should not be construed to restrict the applications or uses of the various preferred embodiments of the present invention in any manner.

Figure 1A:
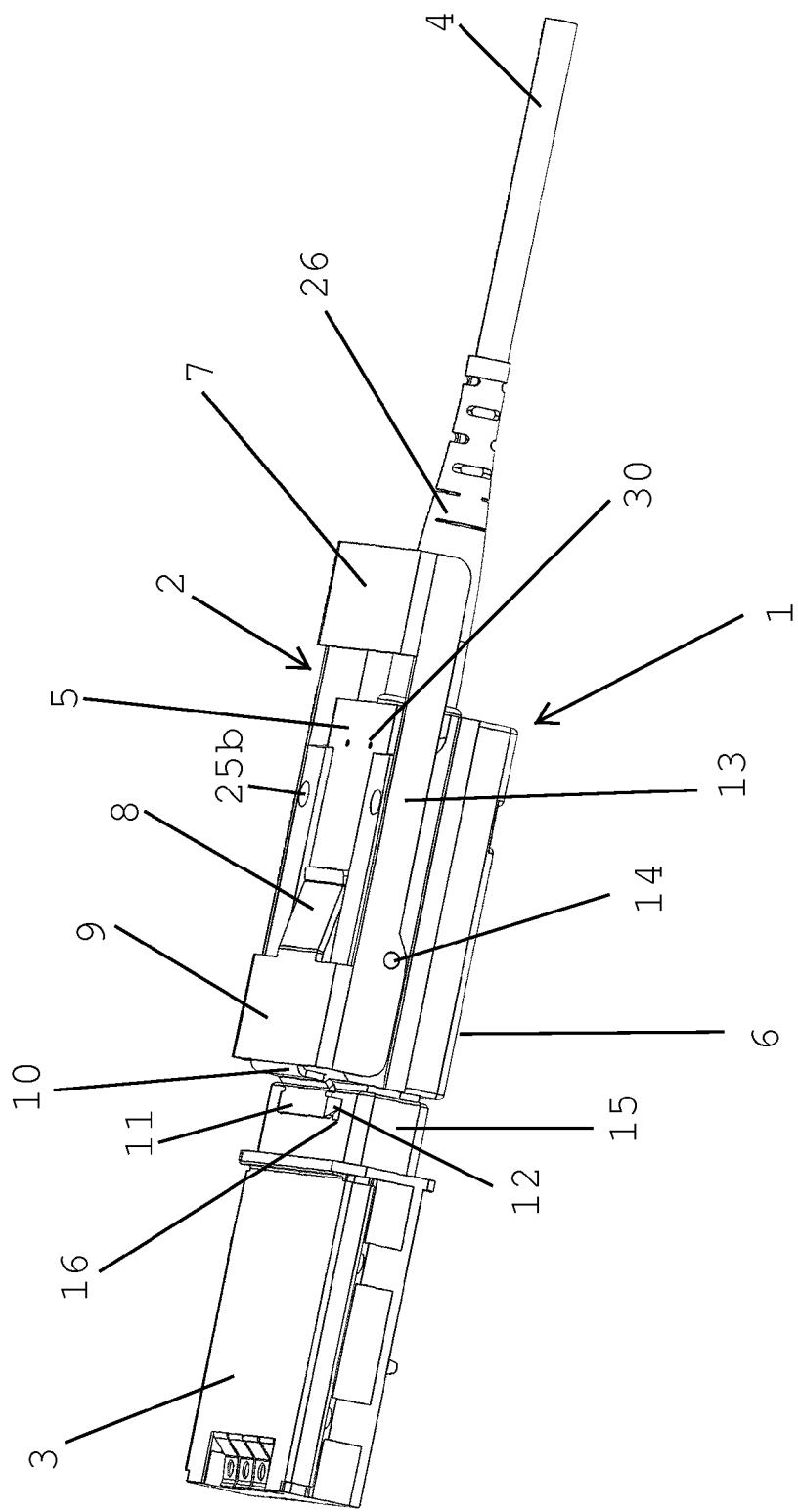
FIG. 1A is a perspective view showing a plug housing in accordance with a preferred embodiment of the present invention being inserted into a receiving receptacle with a closed latch.
Figure 1B:
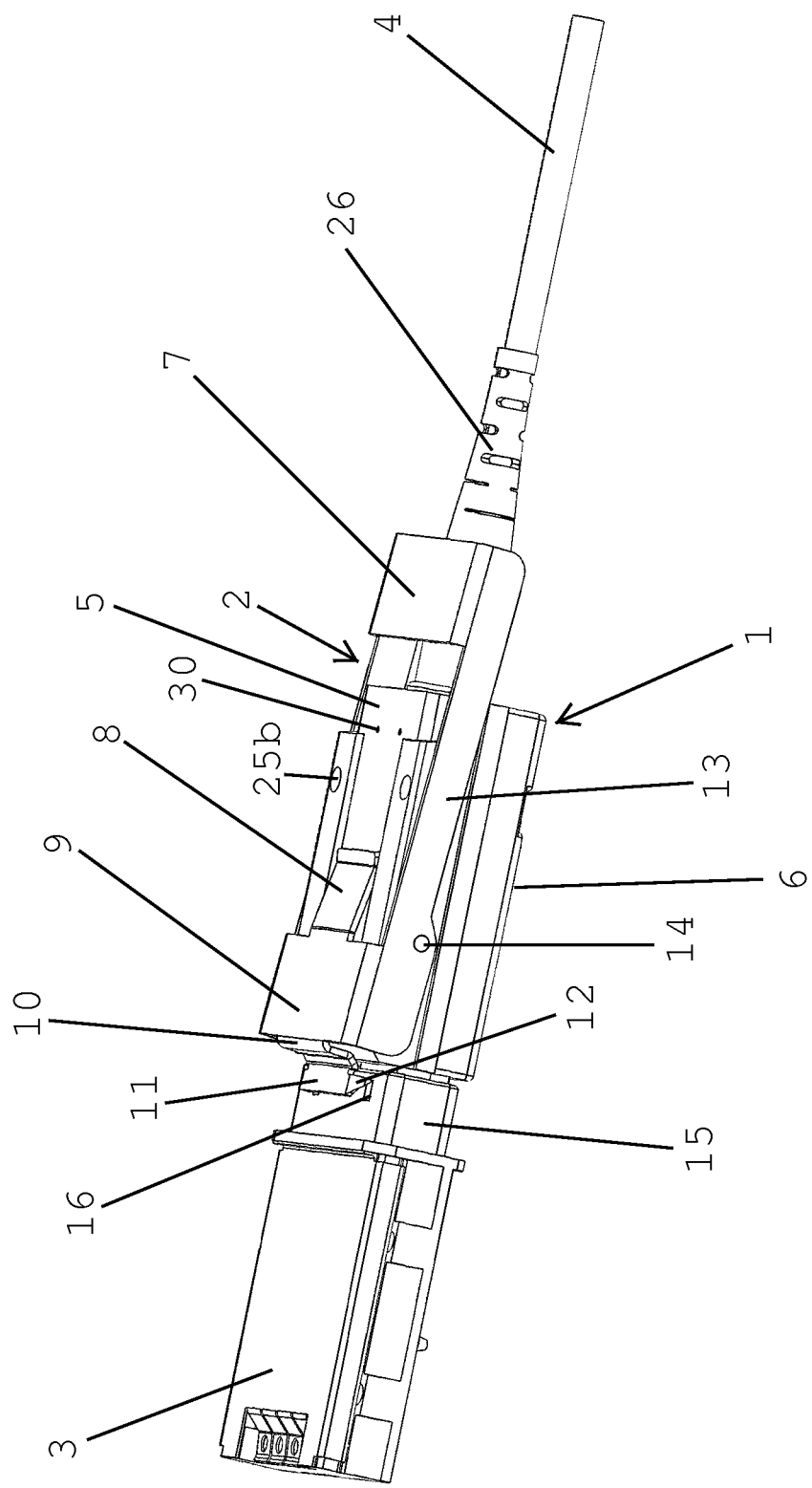
FIG. 1B is a perspective view showing a plug housing in accordance with a preferred embodiment of the present invention being inserted into a receiving receptacle with an open latch.

FIGS. 1A and 1B show a preferred embodiment of a plug housing 1 in accordance with a preferred embodiment of the present invention. The plug housing 1 preferably includes an upper half 5 and a lower half 6 which are connected together through the use of, for example, rivets. The upper half 5 and the lower half 6 are preferably formed through, for example, die casting. However, it is also possible to form the upper half 5 and the lower half 6 through machining, stamping, molding (plastic or metal molding), casting, etc., if so desired. The upper half 5 is preferably arranged to support a latch 2. The plug housing 1 is arranged such that it can be inserted into a receiving receptacle 3 to provide signals transmitted though a cable 4 (which is preferably an optical cable, but could be an electrical cable, an equalized cable, or any other desirable type of cable) to a device connected to the receiving receptacle 3.

Figure 3:
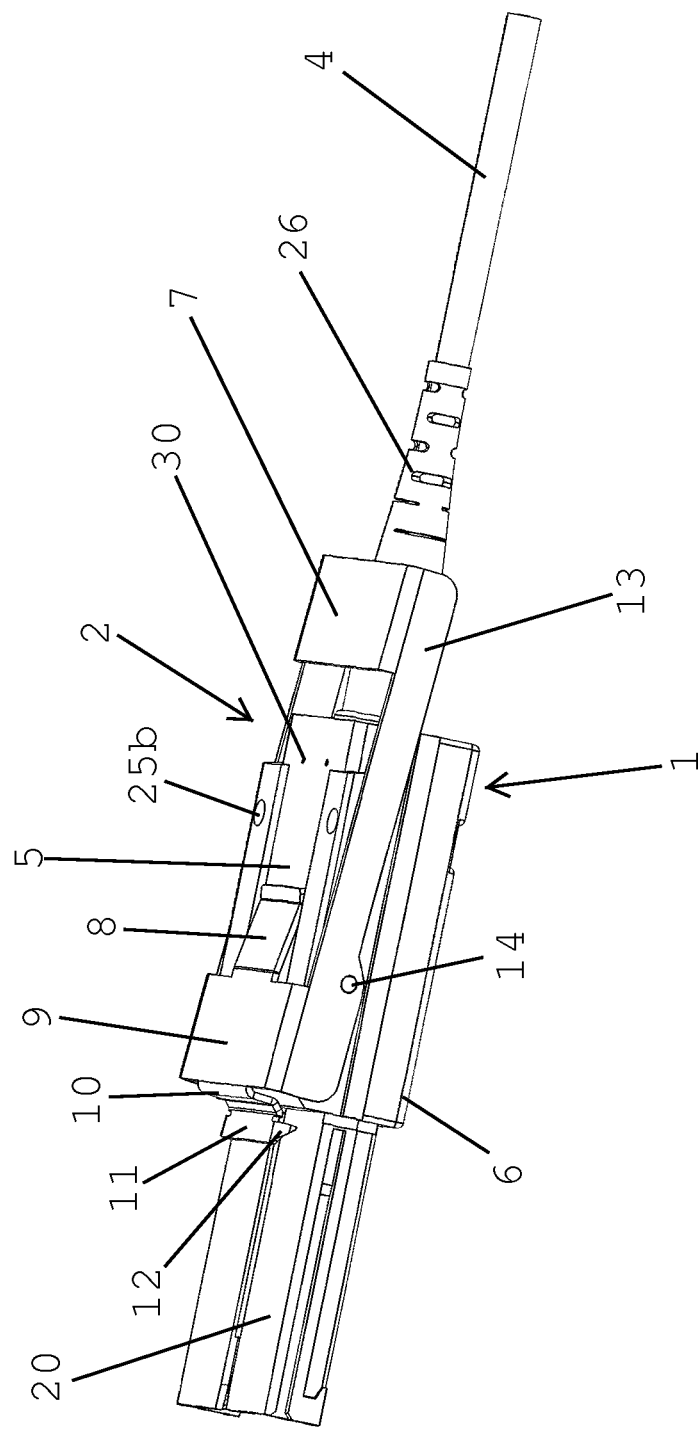
FIG. 3 is a perspective view showing a plug housing in accordance with a preferred embodiment of the present invention.
Figure 4:
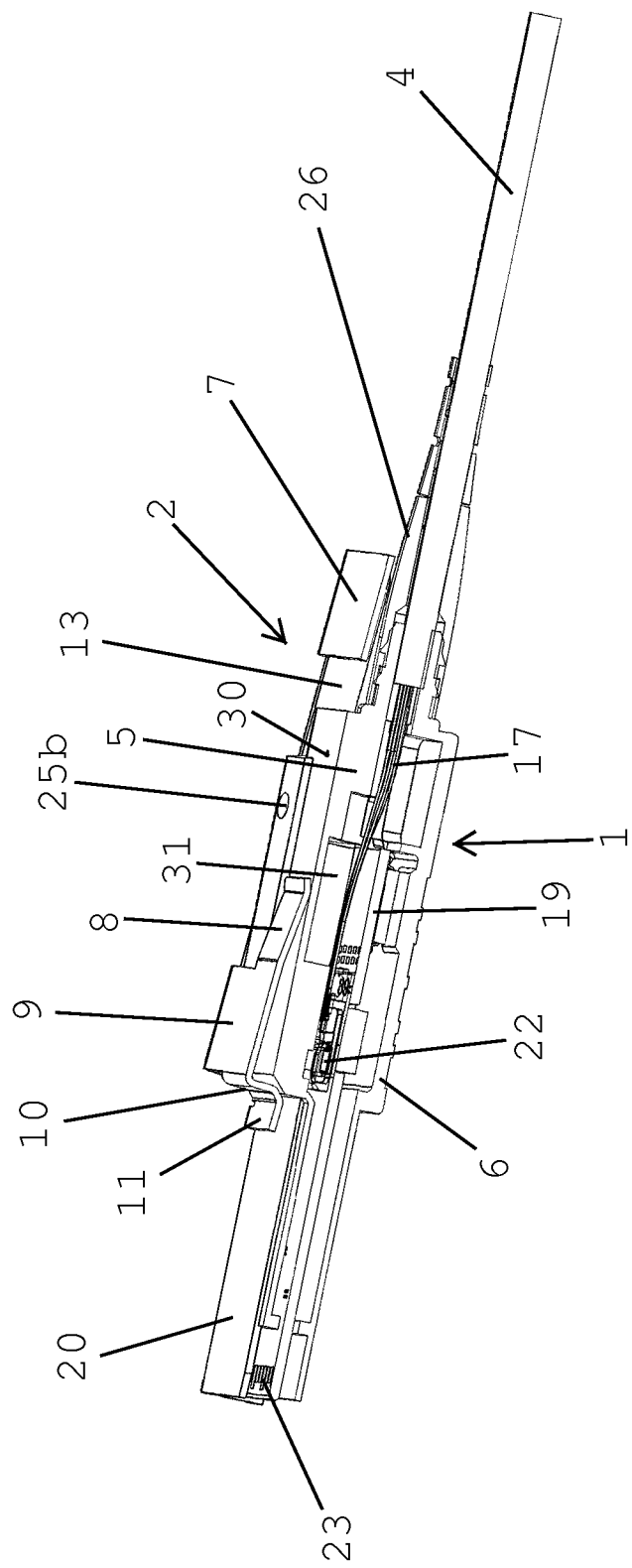
FIG. 4 is a sectional perspective view showing a plug housing in accordance with a preferred embodiment of the present invention.

The plug housing 1 and the receiving receptacle 3 are preferably arranged to be releasably connected to one another in a manner that is both firm and secure through an interaction between a catch mechanism 11 of the latch 2 and retaining notches 16 defined in an opening portion 15 of the receiving receptacle 3 into which an insertion end 20 (as shown in FIG. 3) of the plug housing 1 is inserted. The receiving receptacle 3 preferably includes a connector, such as, for example, a right-angle edge-card connector mounted on a circuit board (neither the right-angle edge-card connector nor the circuit board are shown in the drawings) arranged to receive the signals transmitted though the cable 4.

As stated above, the plug housing 1 is preferably a diecast member defined by the upper half 5 and the lower half 6. The plug housing 1 is preferably provided with a slim profile which lowers its physical weight and which also minimizes an overall plug size of the plug housing 1, which allows the plug housing 1 to enter tighter cavities and provides a user with easier access to the plug housing 1 in tight, densely packed, multi-port designs. For example, a preferred embodiment of the present invention provides a combined plug housing 1 and latch 2 which include a width at the end of the plug housing 1 opposite to the end inserted into the receiving receptacle 3 which is about 78% as wide as the receiving receptacle 3, a length which is about 112% as long as the receiving receptacle 3, and a height which is about 138% as high as the receiving receptacle 3. This provides a significantly slimmer plug housing as compared to conventional plug housings which were typically about 82% as wide as the receiving receptacle 3, about 96% as long as the receiving receptacle 3, and about 173% as tall as the receiving receptacle 3.

The thickness of the plug housing 1 is preferably designed to be minimal to offer weight and space savings while heat transfer pads (defined by, for example, a heat conducting material applied to a surface of a circuit board 19, described later, to transfer heat from the circuit board 19 to at least one of the lower PCB supports 24a, described later) arranged inside of the plug housing 1 offer a maximum heat transfer surface which also offers a thermal mass or a thermal heat sink to the heat producing element of an optical engine 22, which converts photons in optical signals to electrons to produce conductive signals, and vice versa, provided on the circuit board 19 arranged in a cavity 31 of the plug housing 1. Examples of the optical engines 22 are disclosed in U.S. Pat. Nos. 7,329,054; 7,648,287; 7,766,559; and 7,824,112; U.S. Patent Application Publication Nos. 2008/0222351, 2011/0123150, and 2011/0123151; and U.S. Application No. 61/562,371, the entirety of the contents of which are hereby incorporated by reference.

A preferred embodiment of the present invention preferably uses diecast parts for the upper half 5 and the lower half 6 in which the thickness of these diecast parts can be as thin as about 0.015 inches to about 0.020 inches, for example, depending on the rest of the part geometry. A shell thickness of the upper half 5 and the lower half 6 of a preferred embodiment of the present invention above the optical engine 22 is preferably about 0.030 inches, for example. The height of the optical engine 22 is preferably about 0.070 inches, for example. The upper half 5 and the lower half 6 preferably include heat fins (not shown) which add gripping portions and which serve to cool the optical engine 22 by pulling heat away from the cavity 31. The heat fins are preferably arranged adjacent to the insertion end 20 of the plug housing 1.

The upper half 5 preferably includes, for example, a pair of upper rivet holes 25b and the lower half 6 preferably includes, for example, a pair of lower rivet holes 25a. Preferably, the pair of upper rivet holes 25b and the pair of lower rivet holes 25a are arranged on opposing sides of the plug housing 1 with male/female features arranged to locate the centers of rivets to lock the upper half 5 and the lower half 6 together. However, it should be noted that any other type of fastening device other than rivets, such as, for example, screws, pins, etc., could be used instead of the rivets if so desired. Finally, one of the upper half 5 and the lower half 6 preferably includes at least one threaded insert hole 30 which is arranged to penetrate through the upper half 5 or the lower half 6 such that a threaded fastening can be inserted through the threaded insert hole 30 to tie down strengthening strands (discussed later) of the cable 4.

As shown in FIGS. 1A, 1B, 10A, and 10B, the latch 2 preferably includes a top tab 7, a spring member 8, a forward plate 9, a connecting band 10, teeth 12 provided on the catch mechanism 11, a pair of actuator beams 13, and pivot holes 29. The latch 2 is mounted to one of the upper half 5 and the lower half 6 such that the latch 2 will pivot with respect to the rest of the plug housing 1, such mounting can be done in any suitable manner. For example, the latch 2 is preferably mounted to the upper half 5 of the plug housing 1 by a pair of peg protrusions 14 arranged on side portions of the upper half 5. Alternatively, the latch 2 could include a pair of peg protrusions arranged to be inserted into pivot holes or pivot recesses defined in one of the upper half 5 and the lower half 6. The pair of peg protrusions 14 are inserted into the pivot holes 29 such that the latch 2 may move (i.e., pivot) about the pair of peg protrusions 14. The pair of peg protrusions 14 are preferably provided together with the upper half 5 as a single monolithic member; however, the pair of peg protrusions 14 could also be replaced with separately provided pins, rivets, etc. arranged within holes provided in the upper half 5, if so desired. The pair of peg protrusions 14 could alternatively be arranged on the lower half 6 such that the latch 2 would be fixed to pivot about the lower half 6 instead of the upper half 5. Accordingly, the latch 2 is preferably arranged to be near the surface of the plug housing 1 such that the latch 2 can still function while eliminating the need for the plug housing 1 to have a significantly large size to be able to fit the circuit board 19 and the optical engine 22 and various other electronic components 21 (such as, for example, a memory chip, a microprocessor, a microcontroller, an EEPROM chip, a hot swap controller chip arranged to mitigate inverse currents when plugging into live electronics, a clock chip arranged to generate a clock signal, a radio frequency detector chip, etc.) mounted on the circuit board 19 within the cavity 31.

Figure 2A:
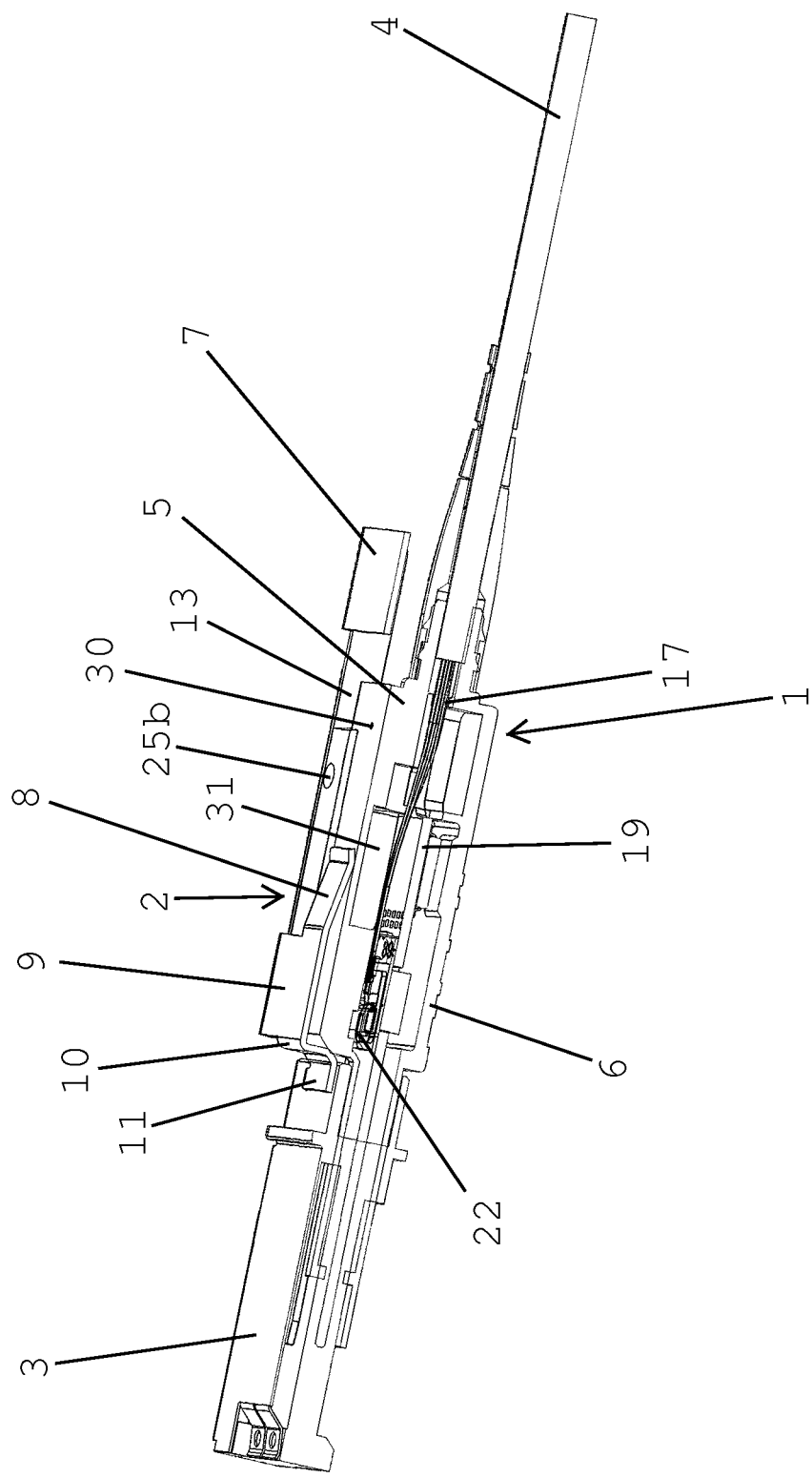
FIG. 2A is a sectional perspective view showing a plug housing in accordance with a preferred embodiment of the present invention being inserted into a receiving receptacle with a closed latch.
Figure 5A:
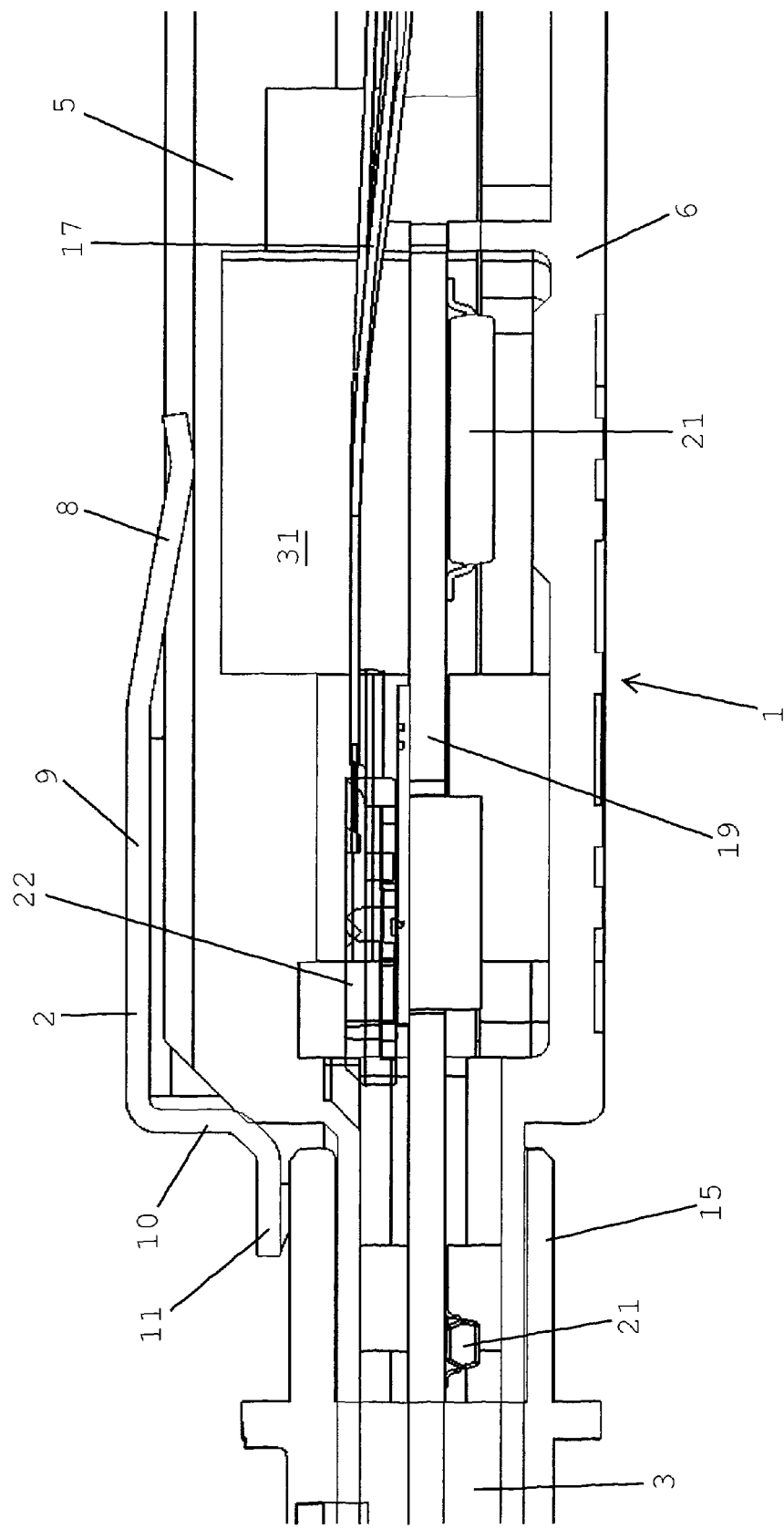
FIG. 5A is a close-up sectional view showing a plug housing in accordance with a preferred embodiment of the present invention being inserted into a receiving receptacle with a closed latch.

The pivot holes 29 of the latch 2 are preferably respectively provided on each of the pair of actuator beams 13, the actuator beams 13 being arranged to connect the top tab 7 together with the forward plate 9. The forward plate 9 is arranged to interconnect the connecting band 10 and the spring member 8 together with the top tab 7 through the pair of actuator beams 13. As shown in FIGS. 1A, 1B, 3, 5A, and 5B, the catch mechanism 11 preferably includes a pair of teeth 12 which are arranged to be inserted into notches 16 in the receiving receptacle 3. When there is no external force being applied to the top tab 7, the spring member 9 preferably presses against an upper surface of the upper half 5 to apply a biasing force to the latch 2 about the pair of peg protrusions 14 such that the catch mechanism 11, which is connected to the connecting band 10, will be pressed down into notches 16 in the receiving receptacle 3. This downward pressing of the teeth 12 into the notches 16 in the receiving receptacle 3 ensures that the plug housing 1 remains firmly fixed to the receiving receptacle 3. This closed arrangement between the latch 2 and the receiving receptacle 3 is shown in FIGS. 1A, 2A, and 5A.

Figure 2B:
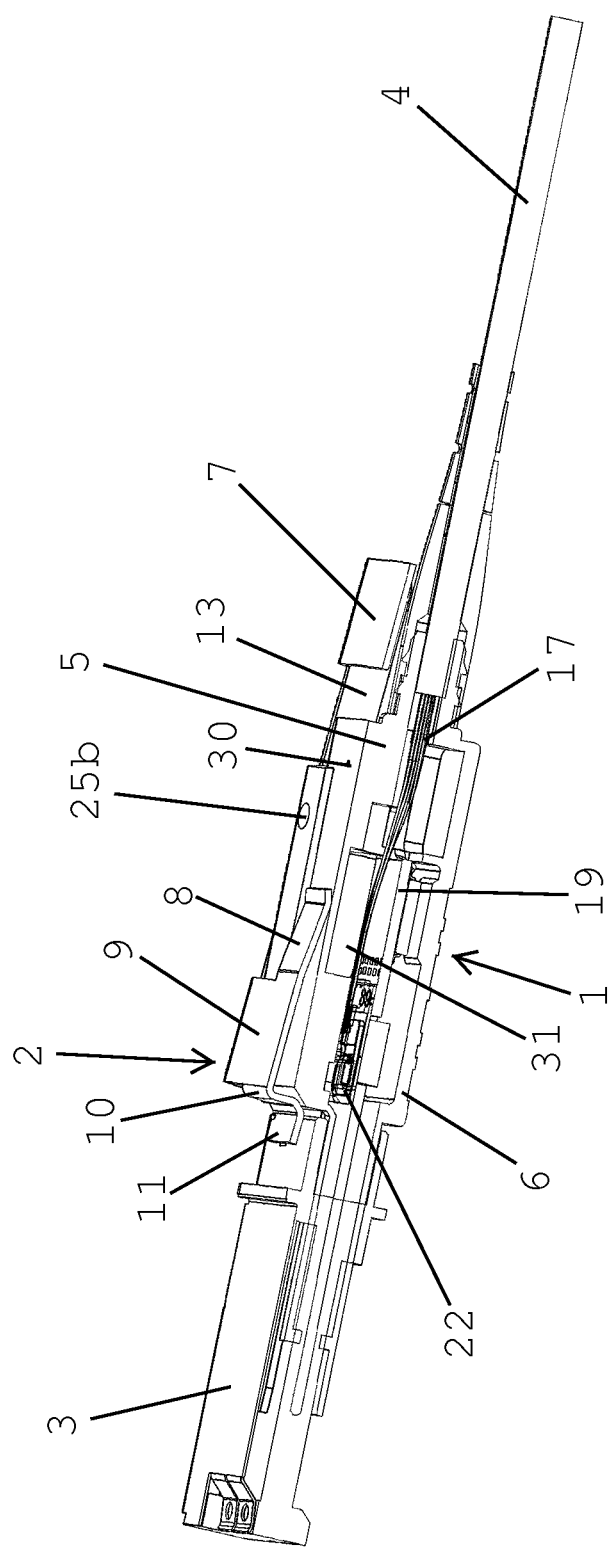
FIG. 2B is a sectional perspective view showing a plug housing in accordance with a preferred embodiment of the present invention being inserted into a receiving receptacle with an open latch.
Figure 5B:
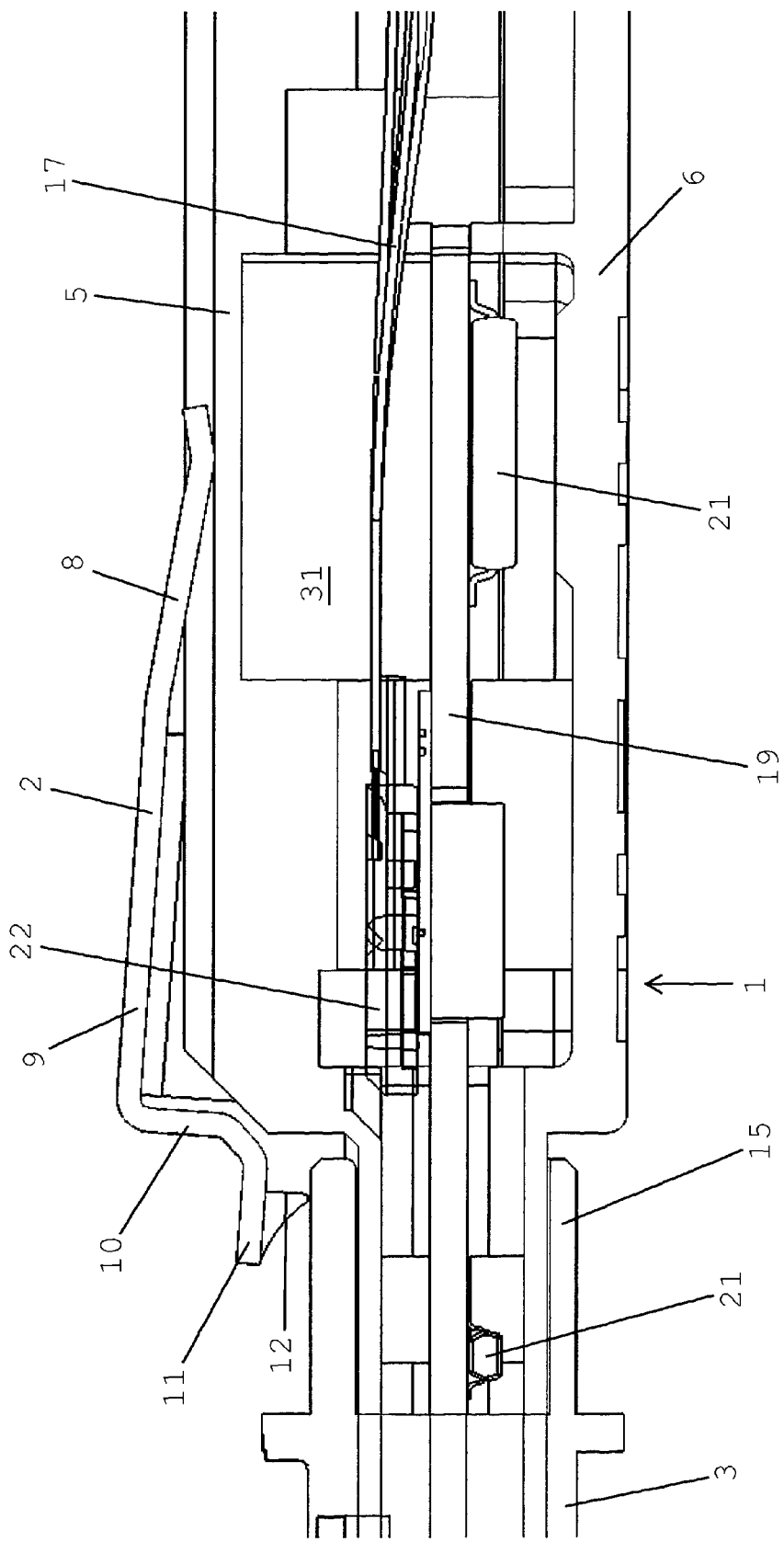
FIG. 5B is a close-up sectional view showing a plug housing in accordance with a preferred embodiment of the present invention being inserted into a receiving receptacle with an open latch.
Figure 6:
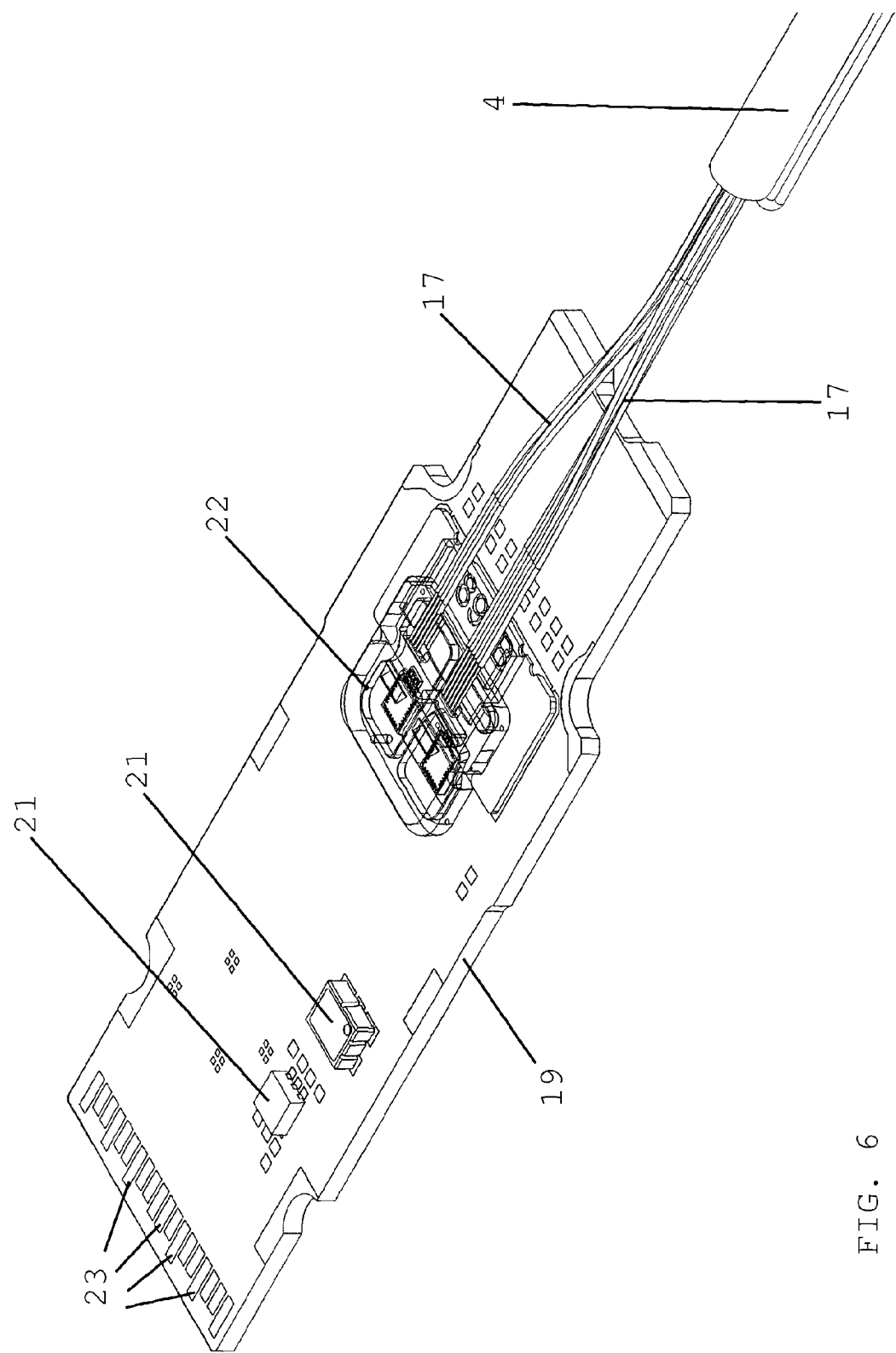
FIG. 6 is a perspective view showing a printed circuit board that is arranged within a plug housing in accordance with a preferred embodiment of the present invention.
Figure 8A:
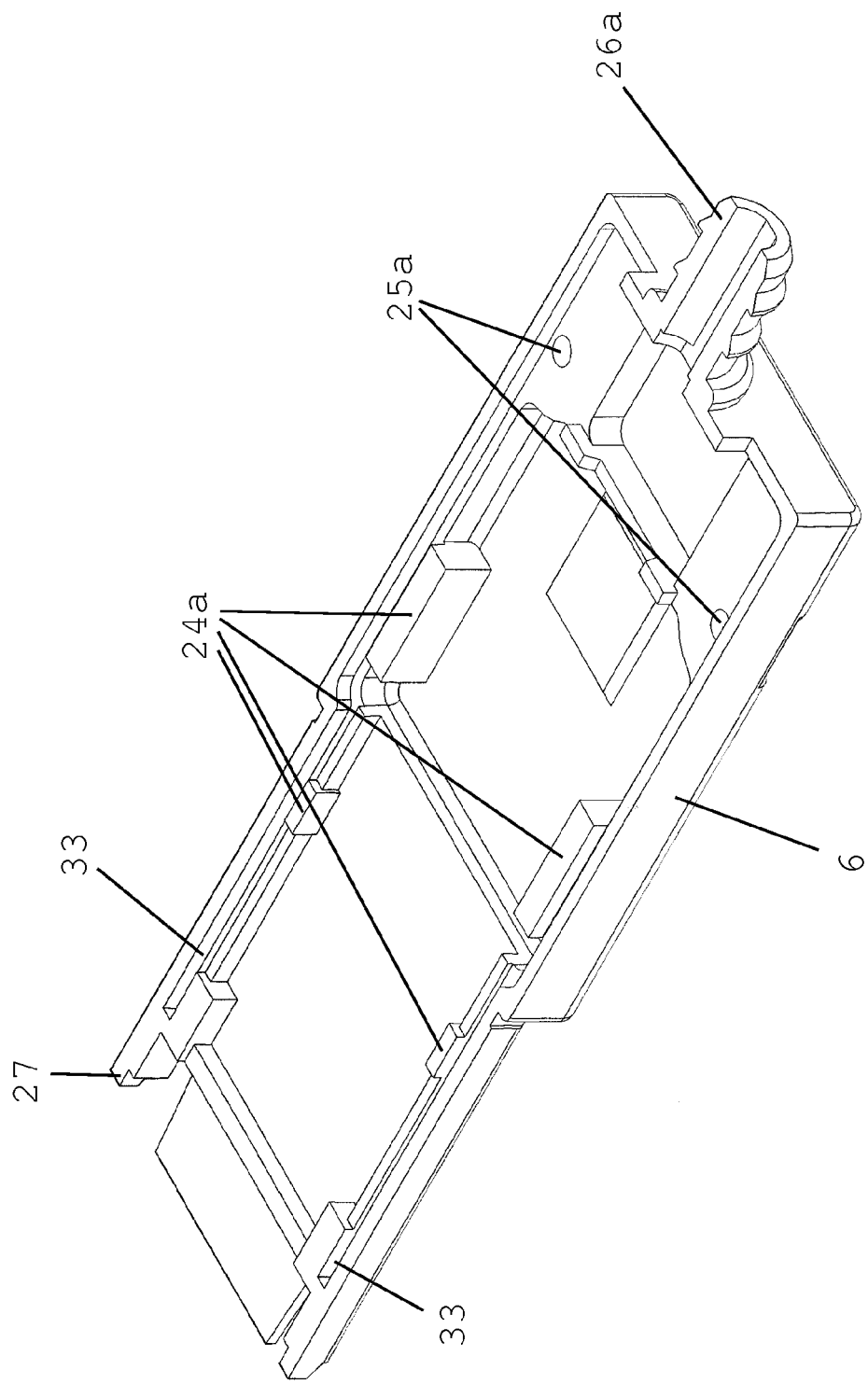
FIG. 8A is a perspective view showing an inner surface of a lower half of a plug housing in accordance with a preferred embodiment of the present invention.
Figure 8B:
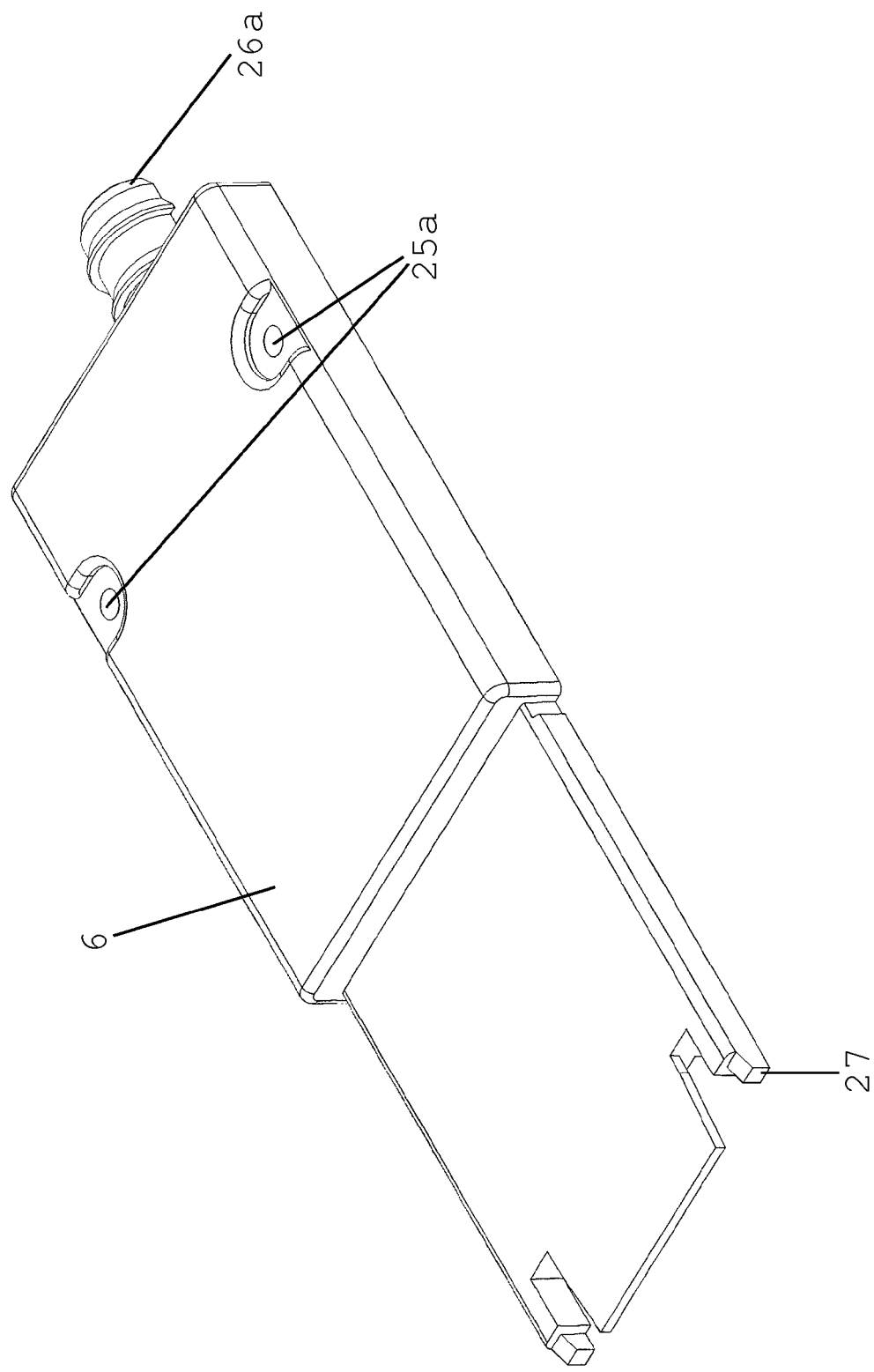
FIG. 8B is a perspective view showing an outer surface of a lower half of a plug housing in accordance with a preferred embodiment of the present invention.
Figure 9A:
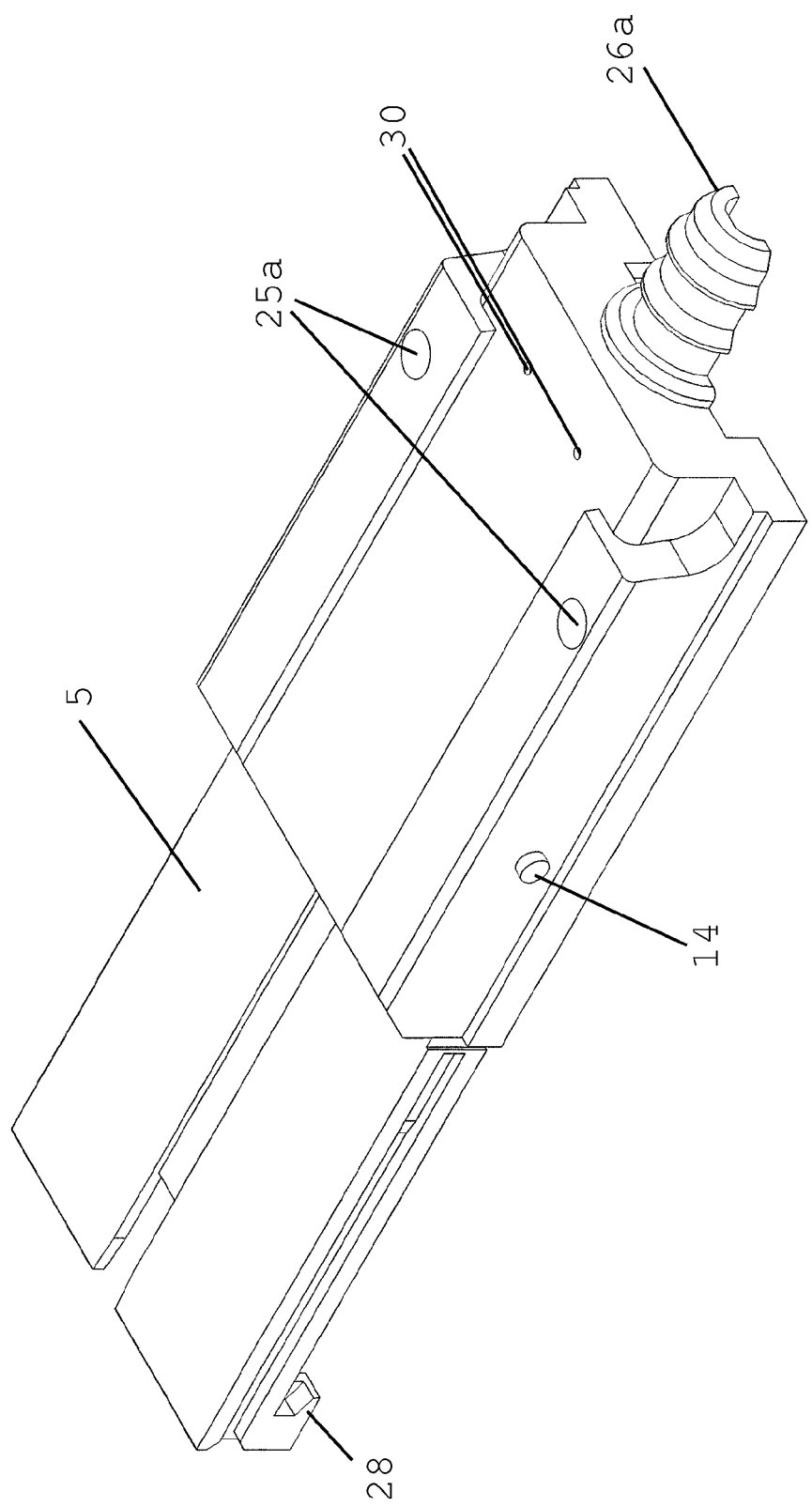
FIG. 9A is a perspective view showing an outer surface of an upper half of a plug housing in accordance with a preferred embodiment of the present invention.
Figure 9B:
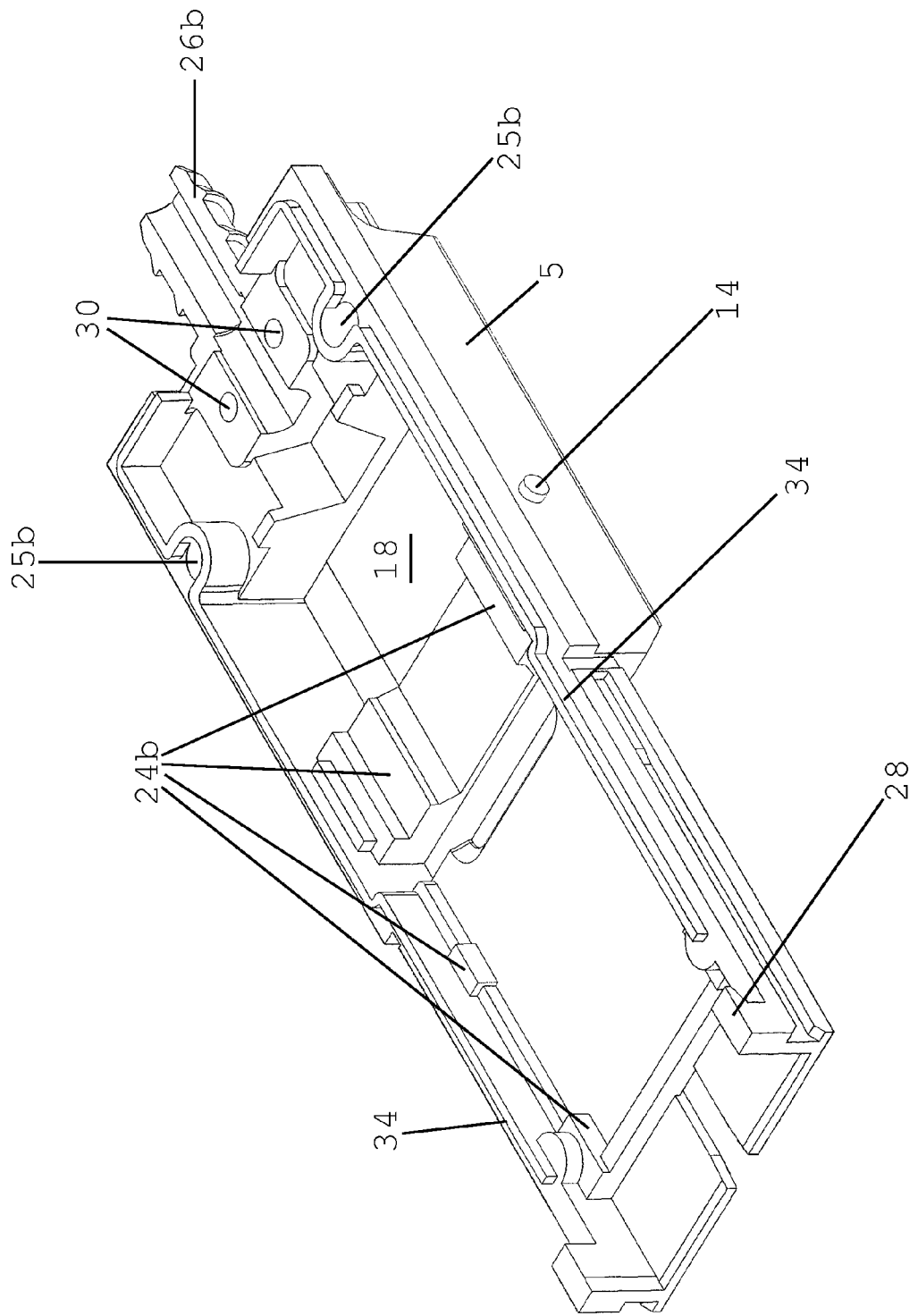
FIG. 9B is a perspective view showing an inner surface of an upper half of a plug housing in accordance with a preferred embodiment of the present invention.

Alternatively, when a user presses the top tab 7 down, the latch 2 pivots about the pair of peg protrusions 14 such that the catch mechanism 11, which is connected to the connecting band 10, raises upward with respect to the upper half 5. When the catch mechanism 11 raises upward with respect to the upper half 5, the teeth 12 raise up out of the notches 16 in the receiving receptacle 3 such that the plug housing 1 is no longer firmly fixed to the receiving receptacle 3 and can be retracted such that the insertion end 20 can be removed from the opening portion 15 of the receiving receptacle 3. This open arrangement between the latch 2 and the receiving receptacle 3 is shown in FIGS. 1B, 2B, and 5B.

The pivot holes 29 of the latch 2 are preferably provided at portions of the pair of actuator beams 13 that are much closer to the forward plate 9 than the top tab 7. Such an arrangement allows the latch 2 to be actuated by the user through the application of a smaller amount of pressing force to the top tab 7 than would be required if the pivot holes 29 of the latch 2 were provided, for example, at a midpoint between the forward plate 9 and the top tab 7. The pair of peg protrusions 14 is preferably located on the sides of the plug housing 1 rearward of the insertion end 20 that fits into the receiving receptacle 3, while still providing sufficient room to allow the heat fins to be located directly above where the heat producing elements of the circuit board 19 are arranged within the cavity 31. The spring member 8 preferably is as wide as possible while also allowing for the placement of the rivets in the upper rivet hole 25b and the lower rivet hole 25a so as to provide a maximum spring beam width, which in turn produces a stronger and more durable latch 2. Additionally, the top tab 7 is preferably located to fit within the contours of the back end of the plug housing 1 to minimize potential cutting/pinching of the cable 4 and any neighboring cables.

Figure 10A:
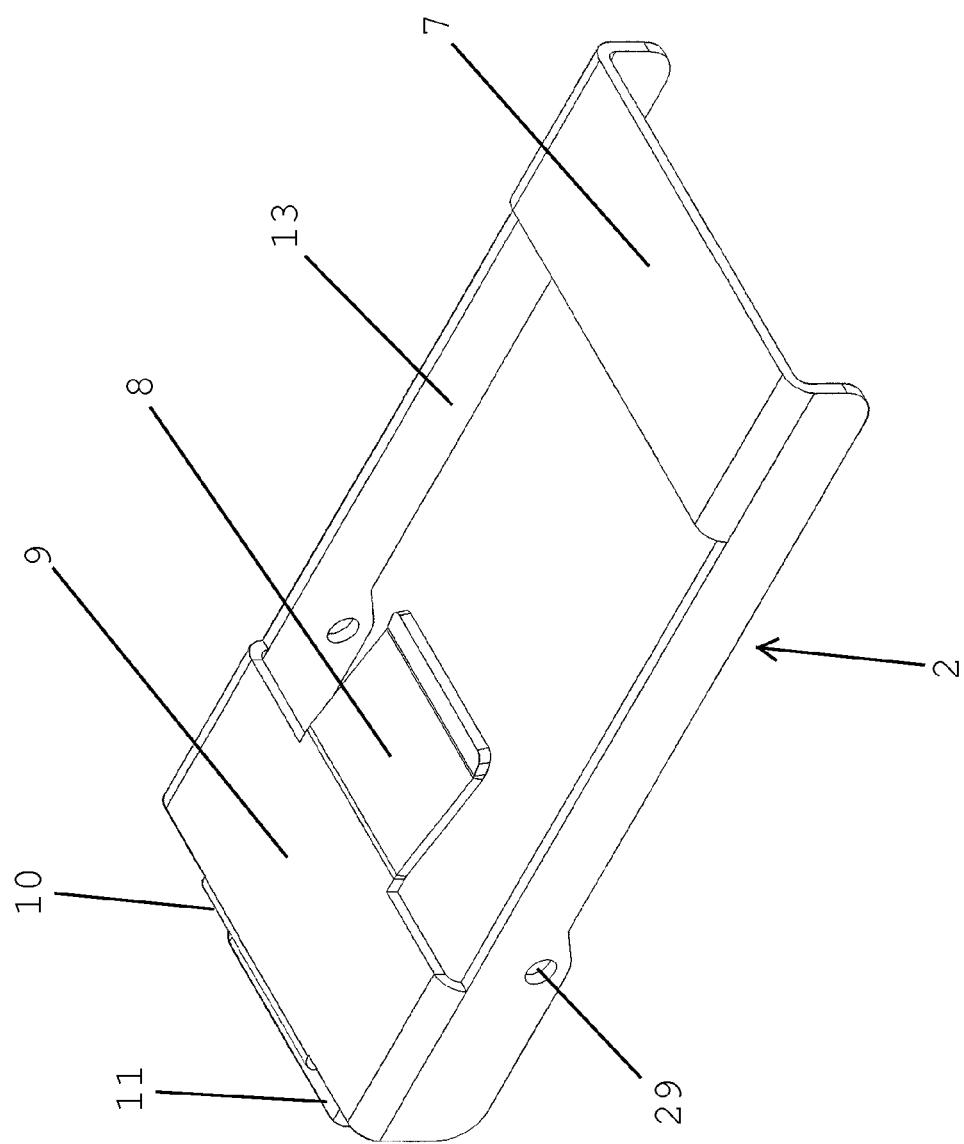
FIG. 10A is a perspective view showing an upper surface of a latch of a plug housing in accordance with a preferred embodiment of the present invention.
Figure 10B:
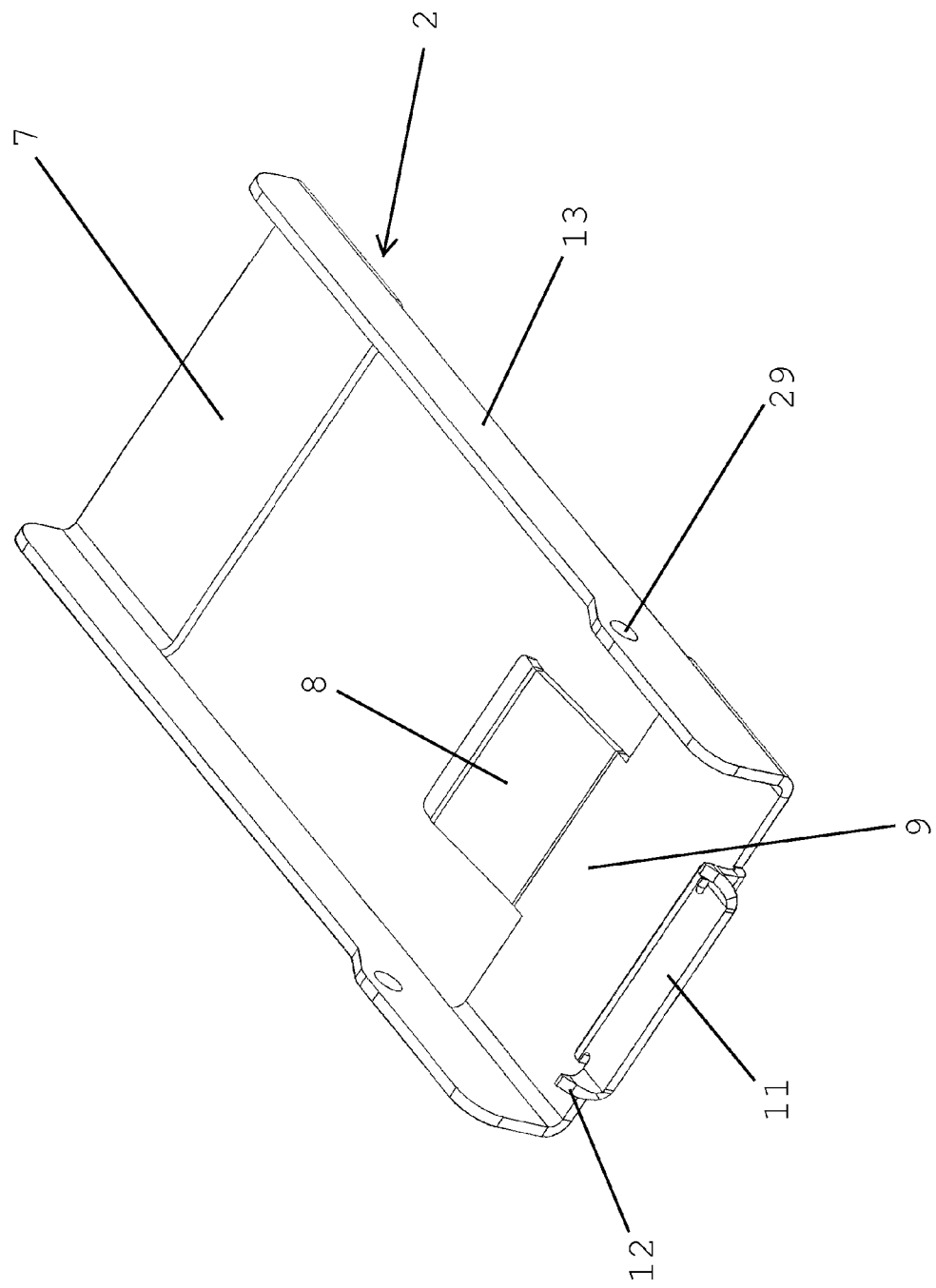
FIG. 10B is a perspective view showing a bottom surface of a latch of a plug housing in accordance with a preferred embodiment of the present invention.

As shown in FIGS. 10A and 10B, the latch 2 is preferably provided by a single monolithic member. The pair of actuator beams 13 are arranged to extend perpendicularly or substantially perpendicularly down from the top tab 7 and the forward plate 9 such that inner side surfaces of the pair of actuator beams 13 are arranged to oppose outer sides of the plug housing 1 when the latch 2 is installed on the plug housing 1 by being pressed onto the plug housing 1 such that the pair of peg protrusions 14 will be snapped into the pivot holes 29 of the latch 2. With such an arrangement, the latch 2 can fit closely around the outer boundaries of the plug housing 1. Because the pair of actuator beams 13 are arranged to extend perpendicularly or substantially perpendicularly down from the top tab 7 and the forward plate 9, it is possible to increase a rigidity of the latch 2 as compared to if the latch 2 were defined by a single flat-plate member. It is preferable to define the pair of actuator beams 13 to be as long as possible without interfering with other elements of the plug housing 1 or other elements in the environment in which the plug housing 1 is used to increase a stiffness and durability of the latch 2.

As discussed above, the catch mechanism 11 preferably includes a pair of teeth 12 which are arranged to be inserted into notches 16 defined in the receiving receptacle 3. When the pair of teeth 12 is inserted into the notches 16, as shown in FIGS. 1A, 2A, and 5A, it is possible to prevent the plug housing 1 from being retracted from the receiving receptacle 3. When the pair of teeth 12 is removed from the notches 16 by actuating the latch 2, as shown in FIGS. 1B, 2B, and 5B, it is possible to retract the plug housing 1 from the receiving receptacle 3. However, the catch mechanism 11 does not necessarily require the use of the pair of teeth 12, and in other preferred embodiments of the present invention, it is possible to provide the catch mechanism 11 with a single tooth, three or more teeth, a locking ridge, a hook, etc. In such other preferred embodiments of the present invention, it is also possible to replace the notches 16 of the receiving receptacle 3 with a single notch, three or more notches, a receiving slot, a trench, an eye, etc.

The plug housing 1 is preferably arranged to support an end of a cable 4. The cable 4 is preferably further supported by a strain relief 26 that is inserted over the retaining ridges of a strain relief connector defined by the lower connector half 26a provided on the lower half 6 and by the upper connector half 26b provided on the upper half 5 to connect the strain relief 26 to the plug housing 1. The lower connector half 26a and the upper connector half 26b are shown in FIGS. 8A-9B. Instead of being inserted over the retaining ridges of the strain relief connector, the strain relief 26 could be connected to the plug housing 1 in any suitable manner, including by being inserted into plug housing 1. The strain relief 26 is preferably provided with a trapezoidal shape, or with any other desirable shape that decreases in width along its length, and is specifically designed to work with the diameter the cable 4. The cable 4 is preferably a fiber optic cable including fiber optic strands 17, strengthening or reinforcing strands (not shown), such as, for example, Kevlar strands, which provide tensile strain relief in the cable 4, and a jacketing material (preferably made of, for example, Teflon, PVC, etc.). Alternatively, in other preferred embodiments of the present invention, the cable 4 can be electrically conductive cable or an equalized cable including, for example, copper wires, shielding, grounding, etc.

As shown in FIGS. 2A, 2B, and 4-7, the end of the cable 4 that is inserted into the lower connector half 26a and the upper connector half 26b has had its jacketing material removed such that the fiber optic strands 17 and the Kevlar strands (not shown) are exposed. The jacketing material of the cable 4 can be glued to one or more of the strain relief 26, the upper half 5, and the lower half 6, and the strain relief 26 can be glued to one or more of the lower connector half 26a and the upper connector half 26b. The strengthening or reinforcing strands are preferably pulled out away from the fiber optic strands and placed in a termination area and, as discussed above, are preferably wrapped around a screw and a washer with the screw being inserted into at least one of the threaded insert holes 30 to fix the strengthening or reinforcing strands. The threaded insert holes 30 may also preferably be arranged to support a cable clamp (not shown) arranged to firmly retain the end of the cable 4 in the plug housing 1. Then, the fiber optic strands 17 are preferably arranged to extend through the cavity 31 of the plug housing 1 to be connected to the optical engine 22 which is mounted to the circuit board 19.

The cavity 31 is designed with specific features, such as lower PCB supports 24a and upper PCB supports 24b which are arranged to trap and hold the circuit board 19 while avoiding any components of the circuit board 19, such as, for example, EEPROM programming touchpads and test pads. The circuit board 19 is preferably arranged to support various electronic components 21 (such as, for example, a memory chip, a microprocessor, a microcontroller, EEPROM chips, discrete electronic elements, a hot swap controller chip arranged to mitigate inverse currents when plugging into live electronics, a clock chip arranged to generate a clock signal, a radio frequency detector chip, etc.) within the cavity 31 and is further provided with, for example, programming pads for a microcontroller, solder pads to which discrete electrical components (such as, for example, surface mountable capacitors, etc.) may be connected, and connection pads 23 (shown in FIG. 6) arranged to be electrically connected to respective contacts preferably provided in the right-angle edge-card connector within the receiving receptacle 3. The circuit board 19 also preferably further includes a metallic slug arranged substantially under the optical engine 22 on the opposite surface of circuit board 19. The metallic slug pulls heat away from the optical engine 22. As mentioned above, the circuit board 19 also preferably includes heat transfer pads (not shown) which are arranged adjacent to the optical engine 22 on an upper surface of the circuit board 19 and which contact, for example, the lower PCB supports 24a to transfer heat from the circuit board 19 to the plug housing 1.

The upper and lower surfaces of the upper half 5 and the lower half 6 of the plug housing 1 are shown in FIGS. 8A-9B. The upper half 5 and the lower half 6 are arranged to be interconnected to one another through channels 33 arranged along the sides of the lower half 6 and corresponding ridges 34 arranged along the sides of the upper half 5. When interconnecting the upper half 5 and the lower half 6, holding projections 27 on the lower half 6 are preferably first inserted into retaining clips 28 defined on the upper half 5 and then the upper half 5 and the lower half 6 are pressed against one another such that the ridges 34 will be inserted into the channels 33 to fix the upper half 5 and the lower half 6 together. Finally, rivets are inserted through the upper rivet holes 25b and the lower rivet holes 25a to firmly fix the upper half 5 and the lower half 6. However, as discussed above, any other type of fastening device other than rivets, such as, for example, screws, pins, etc., could be used instead of the rivets if so desired. It should be noted that the latch 2 can be connected to the plug housing 1 by preferably snapping the pivot holes 29 onto the peg protrusions 14 either before or after the rivets are inserted through the upper rivet holes 25b and the lower rivet holes 25a.

Figure 11A:
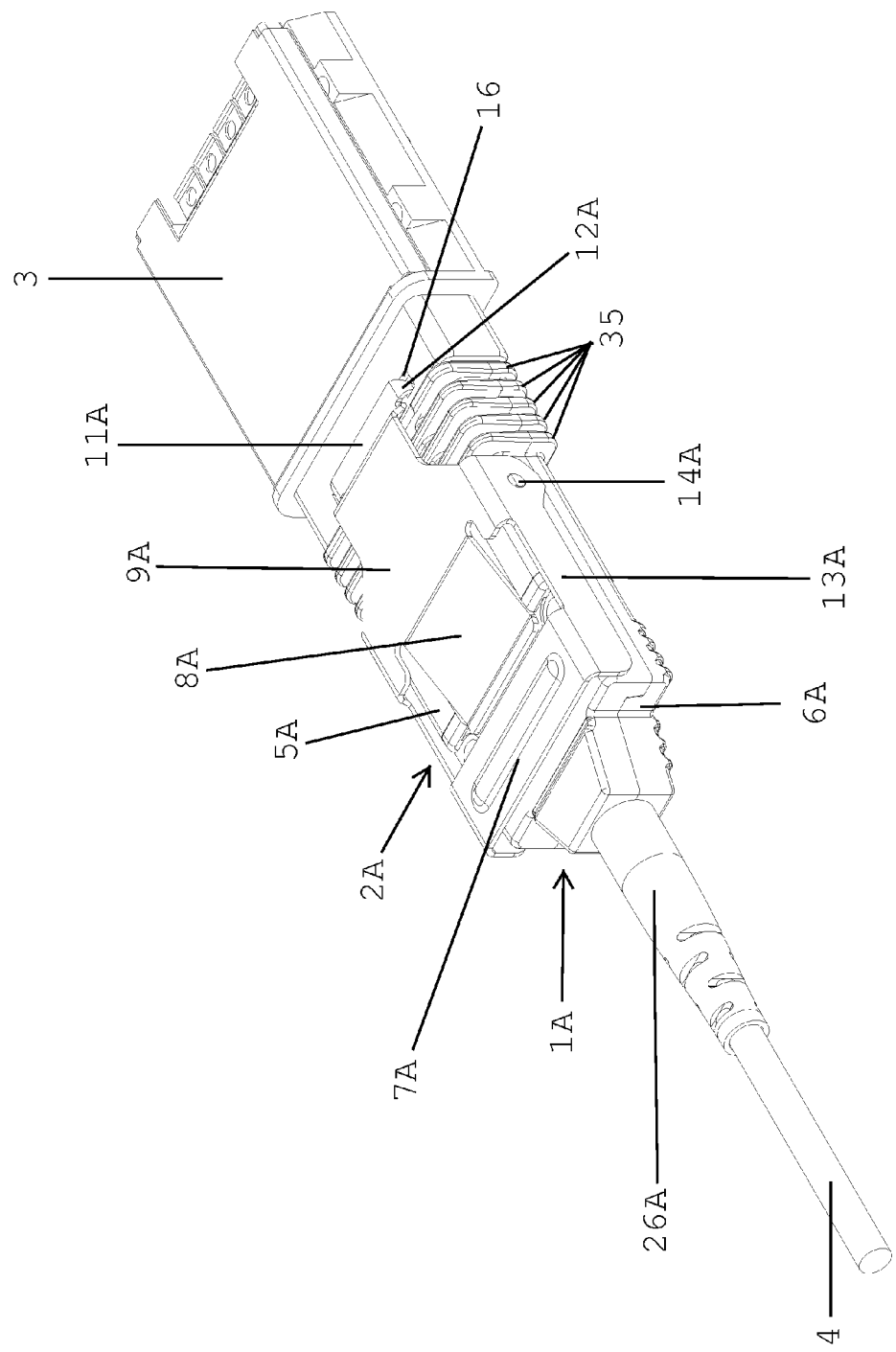
FIG. 11A is a perspective view showing a plug housing in accordance with another preferred embodiment of the present invention being inserted into a receiving receptacle with a closed latch.
Figure 11B:
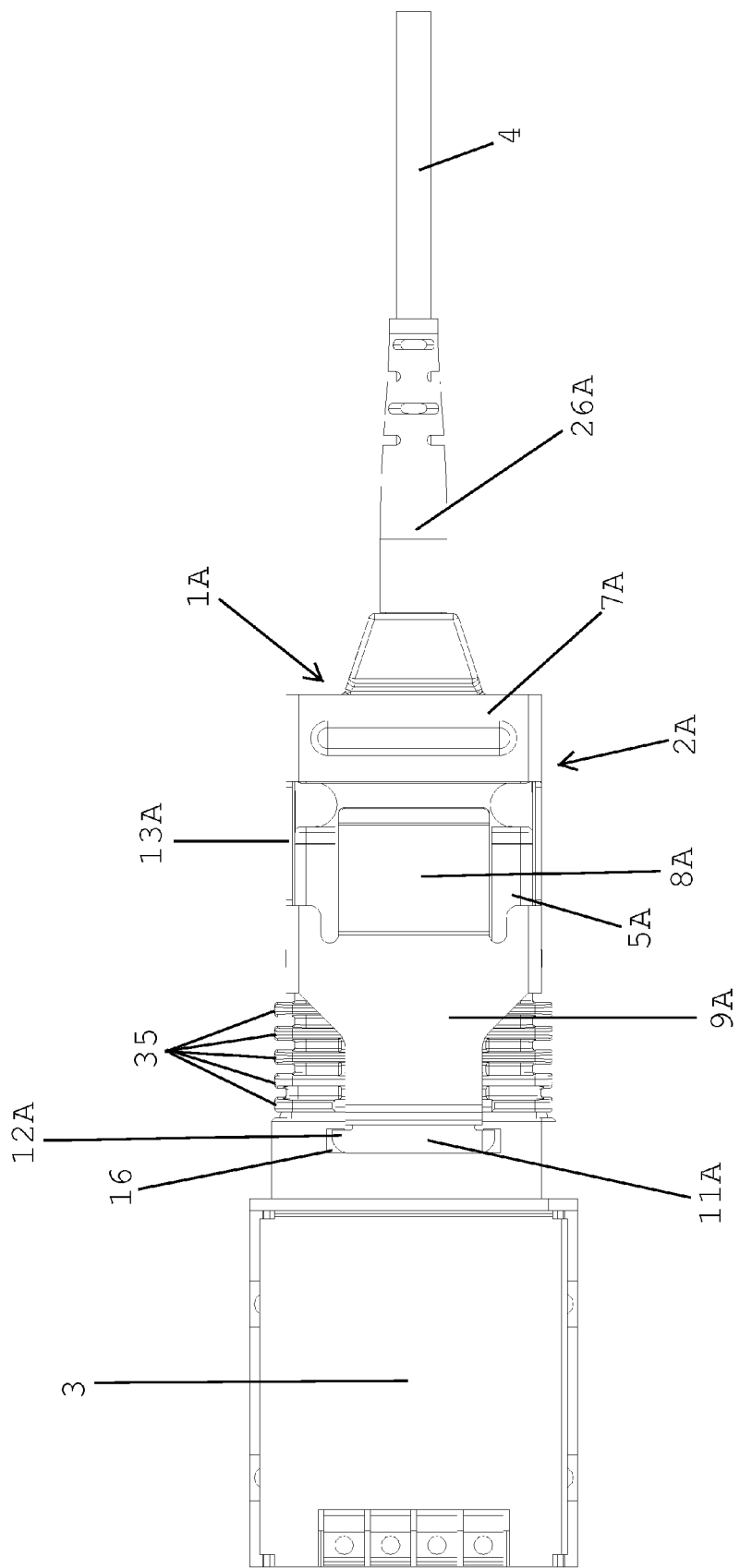
FIG. 11B is a top plan view showing a plug housing in accordance with another preferred embodiment of the present invention being inserted into a receiving receptacle with a closed latch.
Figure 11C:
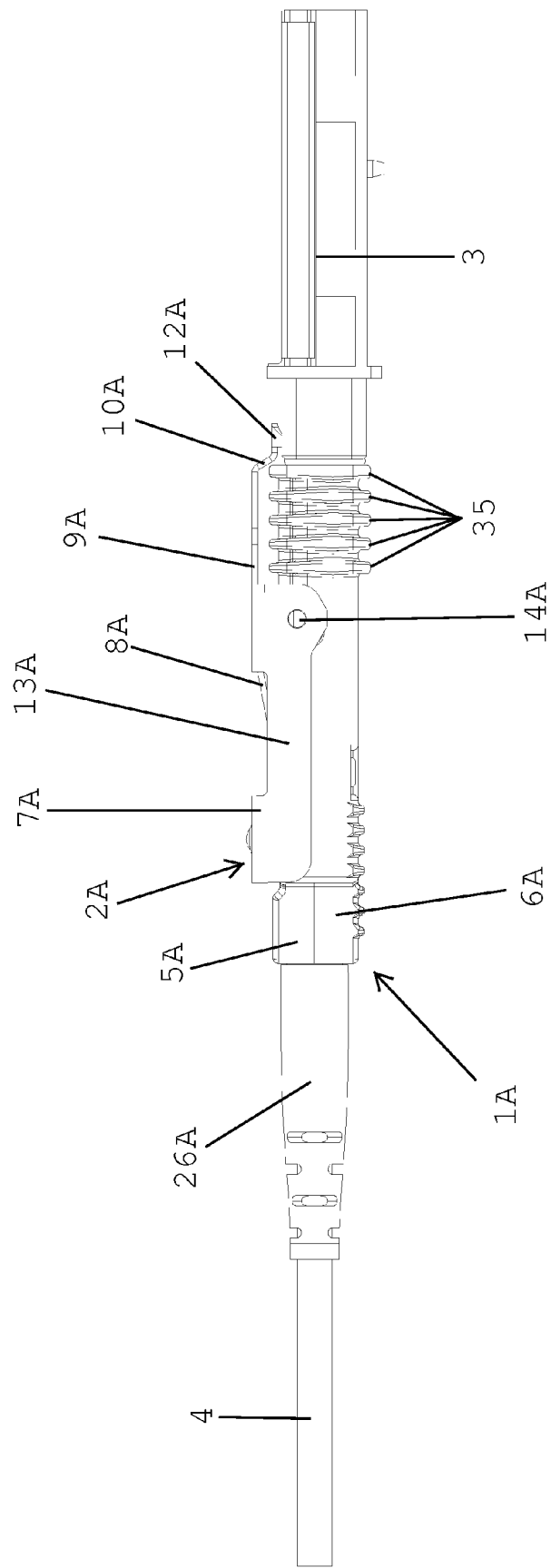
FIG. 11C is a side view showing a plug housing in accordance with another preferred embodiment of the present invention being inserted into a receiving receptacle with a closed latch.

FIGS. 11A-11C show a plug housing 1A in accordance with another preferred embodiment of the present invention. The preferred embodiment shown in FIGS. 11A-11C includes similar features to those discussed above. These similar features are described using the same reference characters discussed above, detailed descriptions of these same reference characters being omitted below for the sake of brevity. The plug housing 1A preferably includes an upper half 5A and a lower half 6A which are connected together through the use of, for example, rivets. The upper half 5A and the lower half 6A are preferably formed through, for example, die casting. However, it is also possible to form the upper half 5A and the lower half 6A through machining, stamping, molding (plastic or metal molding), casting, etc., if so desired. The upper half 5A is preferably arranged to support a latch 2A. The plug housing 1A is arranged such that it can be inserted into a receiving receptacle 3 to provide signals transmitted though a cable 4 (which is preferably an optical cable, but could be an electrical cable, an equalized cable, or any other desirable type of cable) to a device connected to the receiving receptacle 3. The plug housing 1A and the receiving receptacle 3 are preferably arranged to be releasably connected to one another in a manner that is both firm and secure through an interaction between a catch mechanism 11A of the latch 2A and retaining notches 16 defined in the receiving receptacle 3.

As stated above, the plug housing 1A is preferably a diecast member defined by the upper half 5A and the lower half 6A. The plug housing 1A is preferably provided with a slim profile which lowers its physical weight and which also minimizes an overall plug size of the plug housing 1A, which allows the plug housing 1A to enter tighter cavities and provides a user with easier access to the plug housing 1A in tight, densely packed, multi-port designs. As with the preferred embodiment discussed above, the plug housing 1A includes a circuit board 19 (which is not shown in FIGS. 11A-12B) arranged in a cavity 31 of the plug housing 1A. This circuit board 19 preferably includes components similar to those discussed in the above preferred embodiments.

The plug housing 1A is preferably provided with a slim profile which lowers its physical weight and which also minimizes an overall plug size of the plug housing 1A, which allows the plug housing 1A to enter tighter cavities and provides a user with easier access to the plug housing 1A in tight, densely packed, multi-port designs. For example, a preferred embodiment of the present invention provides a combined plug housing 1A and latch 2A which include a width at the end of the plug housing 1A opposite to the end inserted into the receiving receptacle 3 which is about 78% as wide as the receiving receptacle 3, a length which is about 112% as long as the receiving receptacle 3, and a height which is about 138% as high as the receiving receptacle 3. This provides a significantly slimmer plug housing as compared to conventional plug housings which were typically about 82% as wide as the receiving receptacle 3, about 96% as long as the receiving receptacle 3, and about 173% as tall as the receiving receptacle 3.

Diecast parts are preferably used for the upper half 5A and the lower half 6A in which the thickness of these diecast parts can be as thin as about 0.015 inches to about 0.020 inches, for example, depending on the rest of the part geometry. A shell thickness of the upper half 5A and the lower half 6A of a preferred embodiment of the present invention above the optical engine 22 is preferably about 0.030 inches, for example. The height of the optical engine 22 is preferably about 0.070 inches, for example. As shown in FIGS. 11A-11C, the upper half 5A and the lower half 6A preferably include heat fins 35 which add gripping portions and which serve to cool the optical engine 22 by pulling heat away from the cavity 31. The heat fins 35 are preferably arranged over the optical engine 22.

As shown in FIGS. 11A-12B, the latch 2A preferably includes a top tab 7A, a spring member 8A, a forward plate 9A, a connecting band 10A, teeth 12A provided on the catch mechanism 11A, a pair of actuator beams 13A, and pivot holes 29A. The latch 2A is mounted to one of the upper half 5A and the lower half 6A such that the latch 2A will pivot with respect to the rest of the plug housing 1A, such mounting can be done in any suitable manner. For example, the latch 2A is preferably mounted to the upper half 5A of the plug housing 1A by a pair of peg protrusions 14A arranged on side portions of the upper half 5A. Alternatively, the latch 2A could include a pair of peg protrusions arranged to be inserted into pivot holes or pivot recesses defined in one of the upper half 5A and the lower half 6A. The pair of peg protrusions 14A are inserted into the pivot holes 29A such that the latch 2 may move (i.e., pivot) about the pair of peg protrusions 14A. The pair of peg protrusions 14A are preferably provided together with the upper half 5A as a single monolithic member; however, the pair of peg protrusions 14A could also be replaced with separately provided pins, rivets, etc. arranged within holes provided in the upper half 5A, if so desired. The pair of peg protrusions 14A could alternatively be arranged on the lower half 6A such that the latch 2A would be fixed to pivot about the lower half 6A instead of the upper half 5A.

Figure 12A:
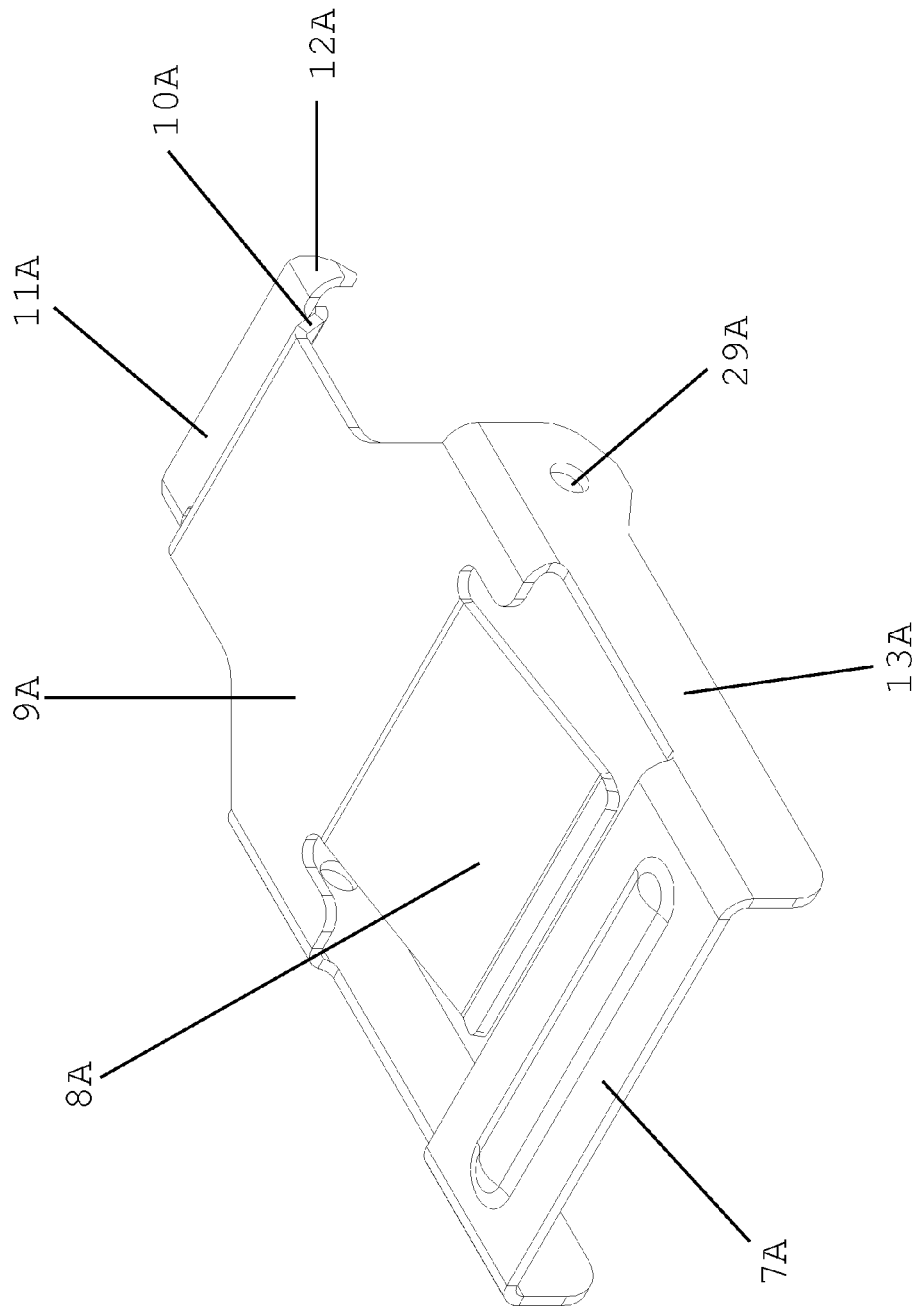
FIG. 12A is a perspective view showing an upper surface of a latch of a plug housing in accordance with another preferred embodiment of the present invention.
Figure 12B:
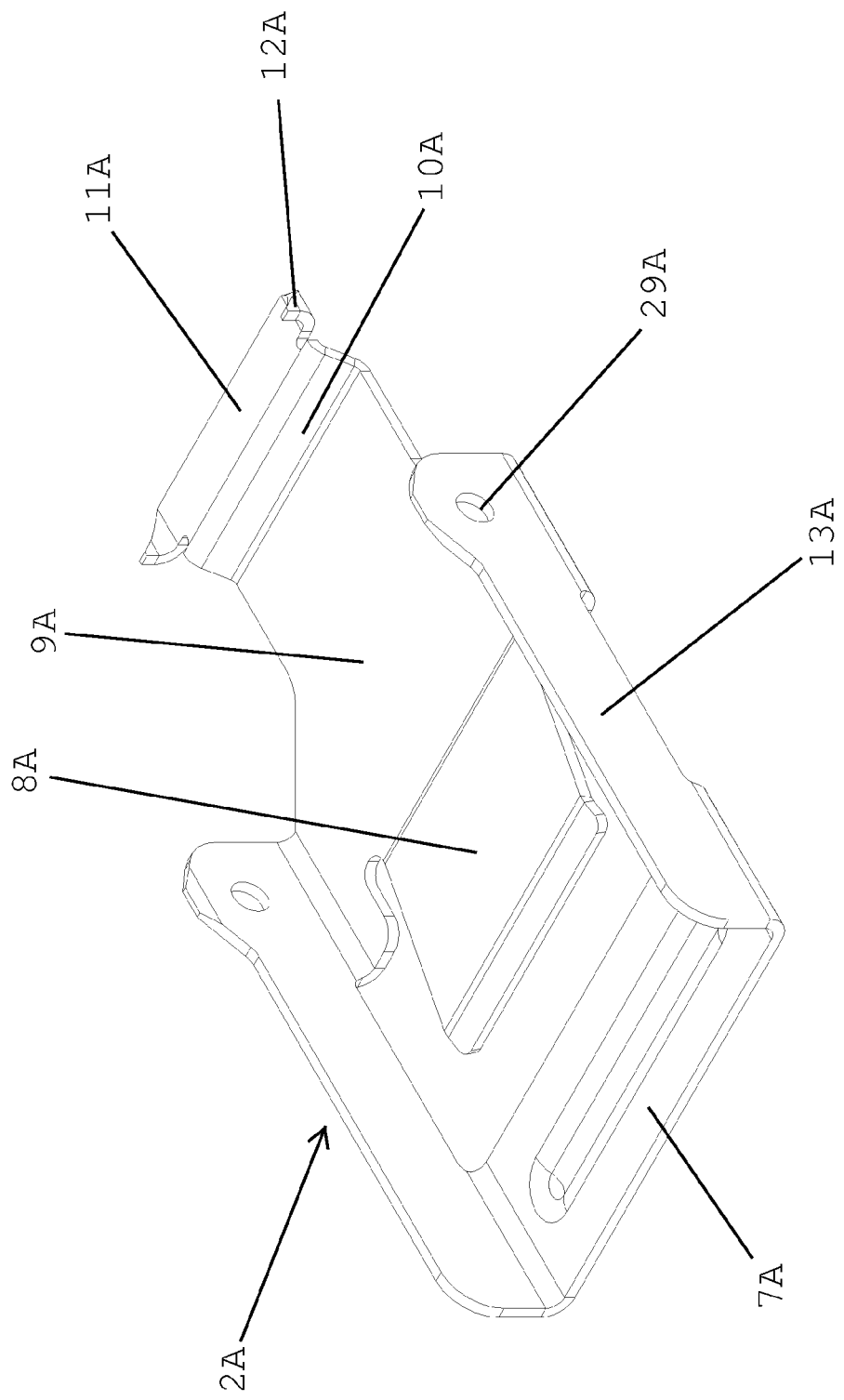
FIG. 12B is a perspective view showing a bottom surface of a latch of a plug housing in accordance with another preferred embodiment of the present invention.

As shown in FIGS. 11A-11C, the latch 2A is preferably arranged to be near the surface of the plug housing 1A such that the forward plate 9A of the latch 2A can extend over the heat fins 35 of the upper half 5A while still being able to position the teeth 12A provided on the catch mechanism 11A within the notches 16 defined in the receiving receptacle 3. The pivot holes 29A of the latch 2A are preferably respectively provided on each of the pair of actuator beams 13A, the actuator beams 13A being arranged to connect the top tab 7A together with the forward plate 9A. The forward plate 9A is arranged to interconnect the connecting band 10A and the spring member 8A together with the top tab 7A through the pair of actuator beams 13A. As shown in FIGS. 11A-11C, the pair of actuator beams 13A and the pair of peg protrusions 14A are both preferably arranged behind the heat fins 35. The forward plate 9A preferably extends from the pair of actuator beams 13A and over the heat fins 35 while decreasing in thickness (as shown in FIGS. 12A and 12B) to provide a user with enough access to grasp the heat fins 35 when removing the plug housing 1A from the receptacle 3 while actuating the latch 2A. As shown in FIGS. 11A-12B, the catch mechanism 11A preferably includes a pair of teeth 12A which are arranged to be inserted into notches 16 in the receiving receptacle 3. When there is no external force being applied to the top tab 7A, the spring member 9A preferably presses against an upper surface of the upper half 5A to apply a biasing force to the latch 2A about the pair of peg protrusions 14A such that the catch mechanism 11A, which is connected to the connecting band 10A, will be pressed down into notches 16 in the receiving receptacle 3. This downward pressing of the teeth 12A into the notches 16 in the receiving receptacle 3 ensures that the plug housing 1A remains firmly fixed to the receiving receptacle 3.

Alternatively, when a user presses the top tab 7A down, the latch 2A pivots about the pair of peg protrusions 14A such that the catch mechanism 11A, which is connected to the connecting band 10A, raises upward with respect to the upper half 5A. When the catch mechanism 11A raises upward with respect to the upper half 5A, the teeth 12A raise up out of the notches 16 in the receiving receptacle 3 such that the plug housing 1A is no longer firmly fixed to the receiving receptacle 3 and can be retracted such that the insertion end 20 can be removed from the opening portion 15 of the receiving receptacle 3. This open arrangement between the latch 2A and the receiving receptacle 3 is similar to the open arrangement shown in FIGS. 1B, 2B, and 5B.

The pivot holes 29A of the latch 2A are preferably provided at portions of the pair of actuator beams 13A that are much closer to the forward plate 9A than the top tab 7A. Such an arrangement allows the latch 2A to be actuated by the user through the application of a smaller amount of pressing force to the top tab 7A than would be required if the pivot holes 29A of the latch 2A were provided, for example, at a midpoint between the forward plate 9A and the top tab 7A. The pair of peg protrusions 14A is preferably located on the sides of the plug housing 1A rearward of the insertion end 20 that fits into the receiving receptacle 3, while still providing sufficient room to allow the heat fins 35 to be located directly above where the heat producing elements of the circuit board 19 are arranged within the cavity 31. The spring member 8A preferably is as wide as possible while also allowing for the placement of the rivets in the upper rivet hole 25b and the lower rivet hole 25a so as to provide a maximum spring beam width, which in turn produces a stronger and more durable latch 2A. Additionally, the top tab 7A is preferably located to fit within the contours of the back end of the plug housing 1A to minimize potential cutting/pinching of the cable 4 and any neighboring cables.

The plug housing 1A is preferably arranged to support an end of a cable 4. The cable 4 is preferably further supported by strain relief 26A that can be connected to the plug housing 1A by being inserted into the plug housing 1A so that the strain relief 26A is held in place between the upper half 5A and the lower half 6A. Instead of being inserted into the plug housing 1A, the strain relief 26A could be connected to the plug housing 1A in any suitable manner, including by being inserted over retaining ridges of a strain relief connector as is shown, for example, in FIGS. 8A-9B.

As shown in FIGS. 12A and 12B, the latch 2A is preferably provided by a single monolithic member. The pair of actuator beams 13A are arranged to extend perpendicularly or substantially perpendicularly down from the top tab 7A and the forward plate 9A such that inner side surfaces of the pair of actuator beams 13A are arranged to oppose outer sides of the plug housing 1A when the latch 2A is installed on the plug housing 1A by being pressed onto the plug housing 1A such that the pair of peg protrusions 14A will be snapped into the pivot holes 29A of the latch 2A. With such an arrangement, the latch 2A can fit closely around the outer boundaries of the plug housing 1A. Because the pair of actuator beams 13A are arranged to extend perpendicularly or substantially perpendicularly down from the top tab 7A and the forward plate 9A, it is possible to increase a rigidity of the latch 2A as compared to if the latch 2A were defined by a single flat-plate member. It is preferable to define the pair of actuator beams 13A to be as long as possible without interfering with other elements of the plug housing 1A or other elements in the environment in which the plug housing 1A is used to increase a stiffness and durability of the latch 2A.

As discussed above, the catch mechanism 11A preferably includes a pair of teeth 12A which are arranged to be inserted into notches 16 defined in the receiving receptacle 3. When the pair of teeth 12A is inserted into the notches 16, as shown in FIGS. 11A-11C, it is possible to prevent the plug housing 1A from being retracted from the receiving receptacle 3. When the pair of teeth 12A is removed from the notches 16 by actuating the latch 2A, it is possible to retract the plug housing 1A from the receiving receptacle 3. However, the catch mechanism 11A does not necessarily require the use of the pair of teeth 12A, and in other preferred embodiments of the present invention, it is possible to provide the catch mechanism 11A with a single tooth, three or more teeth, a locking ridge, a hook, etc. In such other preferred embodiments of the present invention, it is also possible to replace the notches 16 of the receiving receptacle 3 with a single notch, three or more notches, a receiving slot, a trench, an eye, etc.

With the preferred embodiments of the present invention discussed above, it is possible to provide a plug housing with a superior latch. In this plug housing according to a preferred embodiment of the present invention, a pivot point of the latch is shifted forward, while the actuation point is shifted toward the back of the plug housing. Shifting the pivot point of preferred embodiments of the present invention forward provides a latch with a smaller range of motion and greater precision. Also, shifting the actuation point of preferred embodiments of the present invention back gives a greater mechanical moment to the arms of the latch, a lower required actuation force, and a more convenient location to grasp and actuate the latch. Moving the structure of the locking, spring, and actuation members of the latch towards outer side walls of the plug housing more evenly distributes forces and provides a stronger beam design for a mechanical moment arm of the latch.

The preferred embodiments of the present invention discussed above are preferably designed for use with optical cables, for example. In preferred embodiments of the present invention, the mechanical features of the plug housing are preferably separated from the optical features by a top wall which creates a larger-sized cavity with a small width but with a capacity that permits a relatively high component count as constrained by the size of, for example, an optical engine.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A plug housing comprising:
    an upper housing and a lower housing defining a cavity; and
    a latch portion arranged to be pivotable about the plug housing and including:
        a pair of actuator beams;
        a forward plate; and
        an actuating mechanism connected to the forward plate only by the pair of actuator beams; wherein
    respective edges of the pair of actuator beams are connected to respective edges of the forward plate and the actuating mechanism such that the pair of actuator beams extend perpendicularly or substantially perpendicularly downward from the forward plate and the actuating mechanism.

2. The plug housing according to claim 1, further comprising:
    a pair of projection portions arranged on opposite side surfaces of at least one of the upper housing and the lower housing or on opposite ones of a pair of actuator beams of the latch portion; and
    pivot holes arranged to receive a respective one of the pair of projection portions inserted therein, the pivot holes being defined in the opposite side surfaces of at least one of the upper housing and the lower housing or in opposite ones of the pair of actuator beams of the latch portion; wherein
    the latch portion is pivotable about the plug housing at a position corresponding to the pair of projection portions; and
    respective ones of the pair of actuator beams are arranged to be directly opposed to respective ones of the opposite side surfaces.

3. The plug housing according to claim 1, wherein
    the latch portion further includes a catch mechanism; and
    the catch mechanism is arranged to engage with a connecting portion of a receiving receptacle that is arranged to receive the plug housing to prevent the plug housing from being removed from the receiving receptacle.

4. The plug housing according to claim 3, wherein the catch mechanism and the connecting portion are arranged to be selectively engaged and disengaged by applying or removing a force to or from the actuating mechanism such that the latch portion pivots about the plug housing.

5. The plug housing of claim 3, wherein the catch mechanism includes at least one tooth that is arranged to engage with a corresponding at least one notch arranged to receive the at least one tooth in the connection portion.

6. The plug housing of claim 2, wherein the latch portion includes a spring mechanism arranged to press against one of the upper housing and the lower housing to apply a biasing force to the latch portion.

7. The plug housing of claim 6, wherein the spring mechanism is arranged on the forward plate.

8. The plug housing of claim 7, wherein
    the latch portion further includes a catch mechanism; and
    the catch mechanism is connected to a side of the forward plate that is opposite to a side of the forward plate that is connected to the spring portion.

9. The plug housing of claim 8, wherein the catch mechanism is arranged to engage with a connecting portion of a receiving receptacle that is arranged to receive the plug housing to prevent the plug housing from being removed from the receiving receptacle.

10. The plug housing of claim 1, further comprising:
    a circuit board arranged within the cavity; and
    a cable extending into the cavity.

11. The plug housing of claim 10, wherein the circuit board includes one or more of a memory chip, a microcontroller, an EEPROM chip, a hot swap controller chip arranged to mitigate inverse currents when plugging into live electronics, a clock chip arranged to generate a clock signal, and a radio frequency detector chip.

12. The plug housing of claim 10, wherein
    the cable is an optical cable;
    the circuit board includes an optical engine; and
    optical fibers of the optical cable are connected to the optical engine.

13. The plug housing of claim 10, wherein
    the cable further includes strengthening strands; and
    the plug housing further includes a fastener that fixes the strengthening strands within the plug housing.

14. The plug housing of claim 2, wherein
    the latch portion is defined by a single monolithic element including a catch mechanism, the actuating mechanism, a spring mechanism, the forward plate, and the pair of actuator beams; and
    the catch mechanism and the spring mechanism are connected to the forward plate without contacting the pair of actuator beams; and
    the actuating mechanism and the forward plate are arranged between the pair of actuator beams.

15. The plug housing of claim 1, further comprising fasteners inserted into through holes in the upper housing and the lower housing to fix the upper housing and the lower housing together.

16. The plug housing of claim 2, wherein the pair of projection portions are provided together with the at least one of the upper housing and the lower housing as a single monolithic member.

17. The plug housing of claim 10, wherein one or both of the upper housing and the lower housing provide a strain relief connector arranged to support a strain relief of the cable.

18. The plug housing of claim 10, wherein one or both of the upper housing and the lower housing include circuit board supports arranged in the cavity to support the circuit board.

19. The plug housing of claim 1, wherein
one of the upper housing and the lower housing includes channels arranged along one or more sides;
another of the upper housing and the lower housing includes corresponding ridges arranged along one or more sides; and
the ridges are arranged to be inserted within the channels.

20. The plug housing of claim 1, wherein
one of the upper housing and the lower housing includes holding projections;
another of the upper housing and the lower housing includes retaining clips; and
the holding projections are arranged to be inserted into the retaining clips.

21. The plug housing of claim 1, wherein one or both of the upper housing and the lower housing includes heat fins provided thereon.

22. The plug housing of claim 7, wherein
one or both of the upper housing and the lower housing includes heat fins provided thereon; and
the forward plate of the latch portion is arranged to extend directly over the heat fins provided on the one or both of the upper housing and the lower housing.

23. A plug housing comprising:
an upper housing and a lower housing defining a cavity; and
a latch portion arranged to be pivotable about the plug housing and defined by a single monolithic element including:
a pair of actuator beams;
a catch mechanism;
a spring mechanism;
a forward plate; and
an actuating mechanism connected to the forward plate only by the pair of actuator beams; wherein
respective edges of the pair of actuator beams are connected to respective edges of the forward plate and the actuating mechanism such that the pair of actuator beams extend perpendicularly or substantially perpendicularly downward from the forward plate and the actuating mechanism.

24. The plug housing of claim 23, wherein
the latch portion is arranged to be connected to the upper housing and the lower housing through a pair of projection portions or a pair of pivot holes arranged on opposite ones of the pair of actuator beams of the latch portion;
the latch portion is pivotable about the plug housing at a position corresponding to the pair of projection portions or the pair of pivot holes;
the catch mechanism and the spring mechanism are connected to the forward plate without contacting the pair of actuator beams; and
the actuating mechanism and the forward plate are arranged between the pair of actuator beams.

* * * * *